US010087832B2

(12) United States Patent
Tang

(10) Patent No.: US 10,087,832 B2
(45) Date of Patent: Oct. 2, 2018

(54) DOUBLE-CRANKSHAFT VARIABLE COMPRESSION RATIO ENGINE

(71) Applicant: TIANJIN CHALLENGING TECHNOLOGY CONSULTLNG CO.LTD, Tianjin (CN)

(72) Inventor: Minglong Tang, Tianjin (CN)

(73) Assignee: TIANJIN CHALLENGING TECHNOLOGY CONSULTING CO.LTD, Tianjin (CN)

( * ) Notice: Subject to any disclaimer, the term of this patent is extended or adjusted under 35 U.S.C. 154(b) by 132 days.

(21) Appl. No.: 15/338,190

(22) Filed: Oct. 28, 2016

(65) Prior Publication Data

US 2017/0096934 A1    Apr. 6, 2017

Related U.S. Application Data

(63) Continuation of application No. PCT/CN2015/078641, filed on May 11, 2015.

(30) Foreign Application Priority Data

May 15, 2014 (CN) .................... 2014 2 0248875 U
Mar. 26, 2015 (CN) .................... 2015 2 0174693 U

(51) Int. Cl.
| F02B 75/18 | (2006.01) |
| F02B 75/04 | (2006.01) |
| F02B 75/06 | (2006.01) |
| F01M 11/02 | (2006.01) |
| F16C 9/04 | (2006.01) |
| F01B 1/10 | (2006.01) |

(52) U.S. Cl.
CPC ............ F02B 75/045 (2013.01); F01M 11/02 (2013.01); F02B 75/065 (2013.01); F01B 1/10 (2013.01); F16C 9/04 (2013.01)

(58) Field of Classification Search
CPC .. F16C 9/04; F01B 1/10; F02B 75/065; F02B 75/045; F16F 15/26
USPC ................... 123/48 B, 52.4, 52.6, 53.2, 59.6
See application file for complete search history.

(56) References Cited

U.S. PATENT DOCUMENTS

| 4,690,113 A * | 9/1987 | Deland | ................. F02B 75/065 123/197.4 |
| 5,682,844 A * | 11/1997 | Wittner | ................. F02B 75/045 123/197.3 |
| 6,209,496 B1 * | 4/2001 | Pelz | ..................... F02B 75/065 123/197.3 |

* cited by examiner

Primary Examiner — Syed O Hasan
(74) Attorney, Agent, or Firm — Wayne & King LLC

(57) ABSTRACT

Disclosed is a reciprocating piston engine, comprising a combined structure with an optimized double-crankshaft and variable compression ratio pistons, characterized in that the variable compression ratio piston is a piston serving as a double-acting hydraulic cylinder, a control valve bush of a slide-valve type directional control valve is fixed in a central mounting hole of the inner piston, and a control valve core is mounted in a rotatory sliding or nut-ball screw manner in a central mounting hole in the inner surface of the piston top; and the double-crankshaft engine is formed by two reverse rotating crankshafts which are coupled by gears to be in synchronous reverse rotation motion together, each piston being connected to a connecting rod shaft of two crankshafts, and a piston control valve driving mechanism being mounted between the two crankshafts.

6 Claims, 37 Drawing Sheets

DOUBLE-CRANKSHAFT VARIABLE COMPRESSION RATIO ENGINE

CROSS-REFERENCE TO RELATED APPLICATIONS

This application is a continuation of International Patent Application No. PCT/CN2015/078641 with a filing date of May 11, 2015, designating the United States, now pending, and further claims priority to Chinese Patent Application No. 201420248875.9 with a filing date of May 15, 2014 and No. 201520174693.6 with a filing date of Mar. 26, 2015. The content of the aforementioned applications, including any intervening amendments thereto, are incorporated herein by reference.

TECHNICAL FIELD

The present invention relates to a reciprocating piston engine, in particular to a double-crankshaft engine capable of changing a compression ratio.

BACKGROUND OF THE PRESENT INVENTION

A top dead center and a bottom dead center of a well-known ordinary engine are fixed, and a compression ratio is constant, resulting in low ignition pressure and low heat-engine efficiency of a gasoline engine with power adjusted by adjusting an intake volume when at a low load, but the variable compression ratio engine can solve this problem.

The well-known variable compression ratio engine has a movable cylinder head type, a movable crankshaft type, a way of hydraulically changing a piston length and a way of changing the piston length by combining a spring and hydraulic pressure. There is a formed product of the movable cylinder head form, and it proves that the variable compression ratio engine can greatly save the oil consumption. The variable compression ratio engine of the movable cylinder head type and the movable crankshaft type has large movable parts, also increases the complexity of a cam and a power output shaft for driving an air valve, and is not widely popularized at present.

According to the solution for changing the piston by means of hydraulic pressure and by combining the spring and the hydraulic pressure, since the piston is a part moving at a high speed, a hydraulic pipeline is difficult to arrange reliably.

An inventor of the present invention designs a self-pumping variable compression ratio piston (2012204098128) in early days; the piston Is designed as a double-acting hydraulic cylinder; an inner piston of the hydraulic cylinder is connected with a connecting rod; the inner piston and a cylinder body are respectively provided with a control valve sleeve and a control valve element; and the control valve element is classified into an axial moving type and a rotating type. Inner cylindrical surfaces of both control valve sleeves are provided with a liquid passage respectively communicated with an upper hydraulic cylinder and a lower hydraulic cylinder; the middle of each control valve sleeve is a sealing section; the rotating-type control valve element is provided with a spiral liquid passage on an outer cylindrical surface; the axial moving-type control valve element is provided with an annular liquid passage in the middle of an outer cylindrical surface; the control valve element is provided with a central through hole; the central through hole is communicated with the liquid passage on the outer cylindrical surface; the central through hole is respectively communicated with the upper hydraulic cylinder and the lower hydraulic cylinder through a check valve; the liquid passage on the outer cylindrical surface of the control valve element can be communicated with an upper liquid passage and a lower liquid passage on the inner cylindrical surface of the control valve sleeve by rotating the control valve element with the spiral liquid passage on the outer cylindrical surface or axially moving the control valve element with the annular liquid passage on the outer cylindrical surface; when the liquid passage on the outer cylindrical surface of the control valve element is communicated with the liquid passage on the inner cylindrical surface of the valve sleeve, and when the upper hydraulic cylinder is pressed (a typical state is at a power stroke or nearby the bottom dead center), hydraulic oil of the upper hydraulic cylinder enters the control valve element from the upper hydraulic cylinder and flows into the lower hydraulic cylinder through the check valve so as to push the inner piston to move upwards, so that the piston length is reduced, simultaneously the inner piston moves upwards; when the sealing section of the control valve sleeve is opposite to the liquid passage on the valve element, the liquid passage on the valve element is neither communicated with the upper hydraulic cylinder nor communicated with the lower hydraulic cylinder, and the position of the inner piston is fixed; likewise, when the liquid passage on the outer cylindrical surface of the control valve element is communicated with the lower liquid passage on the inner cylindrical surface of the control valve sleeve, and when the lower hydraulic cylinder is pressed (a typical state is at a last phase of an intake stroke and an exhaust stroke), the hydraulic oil of the lower hydraulic cylinder enters the control valve element from the lower hydraulic cylinder and flows into the upper hydraulic cylinder through the check valve to push the inner piston to move downwards, so that the up and down movement of the inner piston is realized by moving the valve element, the length of the piston is changed, no conveying passage of the hydraulic oil is needed, and difficulty in configuring other parts is not increased; however, a small end of the connecting rod of the conventional engine is disposed at the axis of the piston, so that a control rod of the valve element must be installed on a side surface, resulting in an asymmetric structure of the piston; therefore, the cylinder head of the double-hydraulic-cylinder piston is not suitable for being installed by adopting a screw thread with a relatively simple structure, and the structure is relatively complex; the self-pumping variable compression ratio piston (2012204098128) in the early days does not consider the heat expansion problem of working liquid either the self-pumping variable compression ratio piston adopts the check valve, while the check valve is influenced by the movement acceleration of the piston, so that the working parameters are difficult to design.

The well-known engine is generally of a single-crankshaft type, while research and experiment are also done on a double-crankshaft engine; the double-crankshaft engine is provided with two crankshafts; each piston is simultaneously connected with the two crankshafts through connecting rods; the two crankshafts are meshed together; the two crankshafts rotate oppositely, so that the side pressure of the piston can be eliminated; meanwhile, the diameter of main shafts of the two crankshafts and a main shaft of the connecting rods can be reduced, thereby reducing the frictional loss; however, it can be known from some data that the engine may have an asynchronous phenomenon of the two connecting rods nearby the top dead center and the bottom dead center, resulting in instability in operation; the above-mentioned problems can be solved by adding a connecting shaft; the inventor finds through research that when the two crankshafts are coupled by virtue of gears, and then the power is output by virtue of a single drive shaft, since the energy output (a power stroke) and energy intake of the engine occur alternately when in operation, the coupled gear may frequently stay at a forward-backward driving state, and the working state of the coupled gears is extremely severe, which may lead to extremely short service life of the gears.

SUMMARY OF PRESENT INVENTION

Technical problems to be solved in the present invention are: (1) the problem of high difficulty in machining a variable compression ratio piston; (2) the problem of a double-crankshaft variable compression ratio engine control valve subjected to the influence of an acceleration; (3) the problem of heat expansion and cold shrinkage of working liquid of the variable piston hydraulic cylinder; (4) the problem of large operating force of the control valve element probably caused by a pressure difference between the upper end surface and the lower end surface of the variable compression ratio piston control valve element; and (5) the problem of a severe working state of the coupled gears of the double-crankshaft engine.

A specific technical solution is as follows: a double-crankshaft engine is combined with a variable compression ratio piston; the variable compression ratio piston adopts an outer piston as a cylinder sleeve of a double-acting hydraulic cylinder, and a ring-shaped cover plate is fixed on an opening of the cylinder sleeve; an inner piston rod penetrates through the middle of the cover plate; the space of the cylinder sleeve is divided by an inner piston of the double-acting hydraulic cylinder into an upper hydraulic cylinder and a lower hydraulic cylinder; control valve sleeves of a slide-valve-type directional control valve are fixed in a central installation hole of the inner piston; control valve elements are installed in a central installation hole on the inner surface of the piston top in a rotating and sliding manner or by virtue of a nut and a lead screw; a drive rod is installed on a control valve element of a variable compression ratio piston slide-valve-type directional valve, a slide sleeve sliding rectilinearly is installed on a lower portion of the drive rod, and a rotating drive mechanism is arranged on the lower portion to drive the slide sleeve; the double-crankshaft engine is coupled with the crankshafts rotating synchronously in opposite directions through gears; each piston is connected with a connecting rod shaft of the two crankshafts; positions for the drive rods of the variable compression ratio piston to pass through are reserved in the middle of crankshafts and connecting rods of the double-crankshaft engine, and a piston control valve drive mechanism is installed between the two crankshafts; each crankshaft of the double-crankshaft engine is respectively provided with a flywheel; when the directional control valve is at a balanced state, the directional valve is at a closed state; when the valve element is rotated and a valve element oil inlet and a valve element oil outlet move up relatively, the valve element oil outlet is communicated with the upper hydraulic cylinder, the oil inlet is communicated with the lower hydraulic cylinder, liquid is discharged from the upper hydraulic cylinder and enters the lower hydraulic cylinder, the inner piston moves up, the valve sleeve is also driven to move up, the relative positions of the valve element and the valve sleeve are returned to the closed state, the movement is stopped, a total length of the piston is reduced, and conversely, the piston length is increased; since the engine suffers the periodic tensile force and pressure in the movement process, the pressure period of the two-acting hydraulic cylinder is changed periodically; and the control working liquid of the variable compression ratio piston designed in the present invention is low-pressure liquid, and lubricating oil of an engine lubricating system is directly used as the control working liquid of the variable compression ratio piston.

Each crankshaft in the double-crankshaft engine capable of changing a compression ratio is respectively provided with the flywheel; an optimized crankshaft flywheel adopts a scattered type, the scattered flywheels adopt a completely symmetric structure, i.e. each cylinder of the crankshaft is provided with two counterweights, and each counterweight is additionally provided with a flywheel; the scattered flywheels of a weight-reducing structure can also be adopted, the weight-reducing structure I is as follows: the two crankshafts corresponding to each air cylinder are respectively provided with a crankshaft arm with a counterweight and a crankshaft arm both with a counterweight and a flywheel; and the weight-reducing structure II is as follows: the two crankshafts corresponding to each air cylinder are respectively provided with a crankshaft arm with a counterweight, and different crankshaft arms on the two crankshafts are alternately distributed.

The optimized crankshaft adopts a completely separated structure or a partially separated structure; the completely separated crankshaft is in a form that a main shaft, a crankshaft arm and a connecting rod main shaft are separated, while the partially separated crankshaft is in a form that the connecting rod main shaft is of a separated type; the main shaft and the crankshaft arm are in interference fit with each other in a hot charging manner or in conical interference fit with each other in a screw tightening manner, or the crankshaft arm and the connecting rod main shaft are in interference fit with each other, at the moment, the connecting rods are first installed on the connecting rod main shaft and then are connected in an interference fit manner, and the crankshaft arm and the connecting rod main shaft can also be connected in a sliding fit manner; the crankshaft arm connecting rod main shaft with no flywheel is of a blind-hole type; the crankshaft arm flywheel with the flywheel is thick in edges and thin in middle; an annular gap is reserved between the flywheel and a cylinder body separation plate; the connecting rod main shaft is provided with no anti-thrust mechanism on the shaft end of the crankshaft arm with no flywheel and is stopped by virtue of a blind hole; the crankshaft arm comprising the flywheel is provided with an anti-thrust mechanism, and a connecting rod main shaft installation hole is arranged on a position of the cylinder body corresponding to the connecting rod main shaft and used for installing the connecting rod main shaft and the anti-thrust mechanism.

An optimized connecting way of the piston connecting rods is: a three-shaft connection way; the connecting rods are connected together through an inner piston push rod of the piston by virtue of the sliding cooperation of a three-hole connector, a piston pin and a connecting rod small-end shaft; a connecting rod big-end shaft hole is in sliding fit with and installed on the connecting rod main shaft; the three-hole connector is formed by connecting two angular plates respectively with three shaft holes two angular plates with three shaft holes and are connected into a whole body by virtue of a connecting plate; a through hole of the control valve element drive rod is provided in the middle of the connecting plate, a relatively big shaft hole is a piston pin hole, and two relatively small shaft holes are connecting-rod small-end shaft holes; and preferably an opening portion in the middle of the three-hole connector is a structure enlarged outwards.

The variable compression ratio piston in the double-crankshaft engine capable of changing the compression ratio is of a double-acting hydraulic cylinder type; a slide-valve-type control valve is installed on the hydraulic cylinder; a valve sleeve of the control valve is fixed on the inner piston; a valve element of the control valve is installed on the inner surface of a piston top in a rotating and sliding manner, or the valve element of the control valve is installed on the inner surface of the piston top by virtue of a lead screw and a nut; a drive rod of the valve element is driven by adopting an axially-sliding slide sleeve; the drive rod of the valve element is of a hollow type; when a slide core is rotated, the slide core moves relative to an axis of the outer piston; and supplementing liquid of the hydraulic cylinder or the working liquid of the hydraulic cylinder is conveyed through the hollow drive rod. The control valve is classified into six types: (1) a three-position three-way axis-moving self-pumping type; (2) a three-position three-way spiral-groove self-pumping type; (3), a three-groove slide-sleeve three-position four-way external-liquid type; (4) a two-groove slide-sleeve three-position four-way external-liquid type; (5) a two-position four-way spiral-groove longitudinally-distributed type; and (6) a three-position four-way spiral-groove circumferentially-distributed type.

Embodiment 1 of a slide-valve-type directional valve control valve of a variable compression ratio piston is: a three-position three-way axis-moving self-pumping variable compression ratio piston control valve; the structure of the main control valve is equivalent to a three-position three-way directional valve; the valve sleeve is provided with two annular grooves; an upper annular groove is an upper cylinder annular groove communicated with the upper hydraulic cylinder; the lower annular groove is a lower cylinder lower annular groove communicated with the lower hydraulic cylinder; a valve sleeve sealing section is provided between the upper annular groove and the lower annular groove; a valve element is of a hollow type; a hydraulic oil outlet is provided in the middle portion of the valve element; the hydraulic oil outlet is communicated with a central hole of the valve element; the hydraulic oil inlet in the middle portion of the valve element may be an independent porous form, and may also be provided with an annular groove; the diameter or the height of the hydraulic oil outlet in the middle portion of the valve element is smaller than or equal to the height of the valve sleeve sealing section; two ends of the valve element are respectively provided with hydraulic oil inflow holes; check valves are installed in each hydraulic oil inflow hole; liquid in the check valve flows outwards from the check valve; an outlet of an upper check valve is communicated with the upper hydraulic cylinder, and a lower check valve is communicated with the lower hydraulic cylinder; a check valve is installed on the top of the drive rod of the valve element, and the liquid flow direction of the check valve is from bottom to top; the valve element is installed in the valve sleeve in a sliding manner; the valve sleeve is fixed on the inner piston; the valve element is installed in the central installation hole on the inner surface of the piston top by virtue of a nut and a lead screw; the check valves adopt circlip-type horizontal moving check valves; a safety device is arranged on the piston to eliminate the safety danger when in heat expansion of the hydraulic oil; the control valve element is provided with a decompression longitudinal hole for communicating the space of the valve element installation hole and exterior; the longitudinal hole is not communicated with the central hole, thereby reducing the pressure generated by the leakage of little hydraulic oil, and reducing an operating force of the control valve element; the drive rod on the lower portion of the valve element is rotated, the valve element moves up and down in the axial direction relative to the outer piston, and a relative relation of the valve sleeve and the valve element has three states: (1) the valve sleeve sealing section is opposite to the hydraulic oil outflow hole, and liquid between the upper hydraulic cylinder and the lower hydraulic cylinder does not flow; (2) the upper annular groove of the valve sleeve is opposite to the hydraulic oil outflow hole of the valve element, when the pressure of the upper hydraulic cylinder is higher than that of the lower hydraulic cylinder, the liquid of the upper hydraulic cylinder flows into the valve element and flows to the lower hydraulic cylinder via the lower check valve, when the pressure of the upper hydraulic cylinder is smaller than or equal to the pressure of the lower hydraulic cylinder, the liquid of the two cylinders does not flow, as the liquid of the upper hydraulic cylinders flows to the lower hydraulic cylinder, the inner piston moves upwards, a total length of the piston is reduced, and when the valve sleeve sealing section is opposite to the hydraulic oil inflow hole of the valve element, the liquid of the two hydraulic cylinders does not flow; (3) the lower annular groove of the valve sleeve is opposite to the hydraulic oil outflow hole of the valve element, when the pressure of the lower hydraulic cylinder is higher than the pressure of the upper hydraulic cylinder, the liquid of the lower hydraulic cylinder flows into the valve element and flows into the upper hydraulic cylinder via the upper check valve, when the pressure of the lower hydraulic cylinder is smaller than or equal to the pressure of the upper hydraulic cylinder, the liquid of the two cylinders does not flow, as the liquid of the lower hydraulic cylinder flows to the upper hydraulic cylinder, the inner piston moves downwards, a total length of the piston is increased, the sealing section of the valve sleeve is opposite to the hydraulic oil outflow hole of the valve element, and the liquid of the two hydraulic cylinders does not flow; and since the pressure of the two hydraulic cylinders is alternately changed when the engine works, the liquid in the two cylinders can flow always along with the rotation of the drive rod, thereby realizing the variation of the piston length.

The three-position three-way axis-moving self-pumping variable compression ratio piston control valve is provided with a safety device, thereby eliminating the safety danger caused by the heat expansion of the hydraulic oil; a solution 1 of the safety device: a safety valve is installed on the valve sleeve, an inlet of the safety valve is communicated with the lower hydraulic cylinder, an outlet extends out of the piston, and opening pressure of the safety valve is higher than the working pressure of the lower hydraulic cylinder when the engine is at a highest rotation speed; and a solution 2 of the safety device is a simplified safety device, a sealing ring between an inner piston rod and a hydraulic cylinder cover plate is changed to a split-ring type, and the safety of the hydraulic cylinder is guaranteed by virtue of the slow leakage of an opening.

The check valve in the three-position three-way axis-moving self-pumping variable compression ratio piston control valve is a circlip-type horizontal check valve and adopts a horizontal moving valve element structure, the valve element can be selected from a ball valve, a cone valve and a column valve, and a return spring of the check valve is a split-ring structure.

A one-way inflow valve on the top of the drive rod consists of a valve element and an outer sleeve; the valve element is provided with an upper central hole and a lower central hole, and the upper central hole is not communicated with the lower central hole; a group of (2 to 4) one-way outflow valves (flowing out from the central hole of the drive rod) is horizontally installed on the lower portion, and the one-way outflow valves are uniformly distributed on the circumference; a group of (2 to 4) horizontal through holes is arranged on the upper portion; the outer sleeve is installed outside the valve element in an interference fit manner, a gap is reserved in the middle portion between the outer sleeve and the valve element so as to communicate the one-way outflow valves and the horizontal through holes; and the one-way outflow valves are circlip-type horizontal check valves.

Embodiment 2 of the slide-valve-type directional control valve installed on the variable compression ratio piston is: a three-position three-way spiral-groove self-pumping variable compression ratio piston control valve; a main control valve structure is equivalent to a three-position three-way directional valve; the valve sleeve is provided with two groups of longitudinal grooves; an upper longitudinal groove is an upper cylinder longitudinal groove communicated with the upper hydraulic cylinder; the lower longitudinal groove is a lower cylinder lower longitudinal groove communicated with the lower hydraulic cylinder; a sealing section is provided between the upper longitudinal groove and the lower longitudinal groove; the valve element is of a hollow type; a hydraulic oil outflow hole is formed in the middle portion of the valve element and communicated with the central hole of the valve element; the outer cylindrical surface of the middle portion of the valve element is provided with a spiral groove; the hydraulic oil outflow hole in the middle portion of the valve element is disposed in the spiral groove; at an intersected surface of the valve sleeve longitudinal groove and the spiral groove, when the valve sleeve sealing section is disposed in the middle of the spiral groove, the sealing section can completely seal the spiral groove; the top and the bottom of the valve element are respectively provided with a hydraulic oil inflow hole; check valves are installed in each hydraulic oil inflow hole; liquid in the check valve flows outwards from the valve element; an outlet of an upper check valve is communicated with the upper hydraulic cylinder; a lower check valve is communicated with the lower hydraulic cylinder; the check valve is installed on the top of the drive rod of the valve element; the valve element is installed in the valve sleeve in a sliding manner; the valve sleeve is fixed on the inner piston; the valve element is installed in a central installation hole of the inner surface of the piston top in a rotating and sliding manner by virtue of a positioning nut and a positioning step; the liquid of the check valve flows from bottom to top; the check valves adopt circlip-type horizontal moving check valves; a safety device is arranged on the piston so as to eliminate the safety danger caused by the heat expansion of the hydraulic oil; the control valve element is provided with a decompression longitudinal hole for communicating the space of the installation hole and the exterior; and the decompression longitudinal hole is not communicated with the central hole, thereby reducing the pressure generated by the leakage of little hydraulic oil, and reducing the operating force of the control valve element. The drive rod on the lower portion is rotated, the valve element rotates relative to the outer piston, a relative relation of the valve sleeve longitudinal groove and the valve element spiral groove is changed, and a relative relation of the valve sleeve and the valve element has three states: (1) the valve sleeve sealing section just seals the valve element spiral groove, so that the liquid between the upper hydraulic cylinder and the lower hydraulic cylinder does not flow; (2) the upper longitudinal groove of the valve sleeve is communicated with the spiral groove of the valve element, when the pressure of the upper hydraulic cylinder is higher than the pressure of the lower hydraulic cylinder, liquid of the upper hydraulic cylinder flows into the valve element and flows into the lower hydraulic cylinder via the lower check valve, when the pressure of the upper hydraulic cylinder is smaller than or equal to the pressure of the lower hydraulic cylinder, the liquid of the two cylinders does not flow, and as the liquid of the upper hydraulic cylinder flows to the lower hydraulic cylinder, the inner piston moves upwards, so that a total length of the piston is reduced, when the sealing section of the valve sleeve is opposite to the hydraulic oil inflow hole of the valve element, the liquid of the two hydraulic cylinders does not flow; (3) the lower longitudinal groove of the valve sleeve is communicated with the spiral groove of the valve element, when the pressure of the lower hydraulic cylinder is higher than the pressure of the upper hydraulic cylinder, the liquid of the lower hydraulic cylinders flows into the valve element, and flows into the upper hydraulic cylinder via the upper check valve, when the pressure of the lower hydraulic cylinder is smaller than or equal to the pressure of the upper hydraulic cylinder, the liquid of the two cylinders does not flow, and as the liquid of the lower hydraulic cylinder flows to the upper hydraulic cylinder, the inner piston moves downwards, so that a total length of the piston is increased, the sealing section of the valve sleeve is opposite to the hydraulic oil inflow hole of the valve element, and the liquid of the two hydraulic cylinders does not flow; and since the pressure of the two hydraulic cylinders is alternately changed when the engine works, the liquid in the two cylinders always flows along with the rotation of the drive rod, thereby realizing the variation of the piston length.

The three-position three-way self-pumping variable compression ratio piston is provided with a safety device to eliminate the safety danger caused by the heat expansion of the hydraulic oil; a solution 1 of the safety device: a safety valve is installed on the valve sleeve, an inlet of the safety valve is communicated with the lower hydraulic cylinder, an outlet extends out of the piston, and the opening pressure of the safety valve is higher than the working pressure of the lower hydraulic cylinder when the engine is at a highest rotation speed; a solution 2 of the safety device is a simplified safety device, a sealing ring between an inner piston rod and a hydraulic cylinder cover plate is changed to a split-ring type, and the safety of the hydraulic cylinder is guaranteed by virtue of the slow leakage of an opening; and the variable compression ratio piston of other types can adopt a method of slightly moving the valve element to ensure that the hydraulic cylinder is not over-pressure, and the above-mentioned safety measures can also be adopted.

Embodiment 3 of a slide-valve-type directional control valve installed on a variable compression ratio piston is: a three-groove slide-sleeve three-position four-way external-liquid-type variable compression ratio piston control valve; a main valve structure is equivalent to a three-groove valve sleeve three-position four-way slide valve; a valve sleeve is provided with three annular grooves; a middle annular groove is an upper cylinder annular groove communicated with the upper hydraulic cylinder, and a lower cylinder upper annular groove and a lower cylinder lower annular groove are communicated with the lower hydraulic cylinder;

a valve element is of a hollow structure; an upper portion of the valve element is provided with a hydraulic oil inlet provided with a circlip-type horizontal check valve; liquid of the check valve flows outwards from the center of the valve element, and the check valve is communicated with a central hole of the valve element; a hydraulic oil outlet is provided in the middle portion, and the hydraulic oil outlet extends out of the piston; two sealing sections are arranged among the three annular grooves on the valve sleeve; the height of an upper sealing section is greater than or equal to the height of the annular groove at the hydraulic oil inlet on the valve element; the height of a lower sealing section is greater than or equal to the diameter of the hydraulic oil outlet in the middle portion of the valve element; the valve element is installed in the valve sleeve in a sliding manner, and the valve sleeve is fixed on the inner piston; the valve element is installed in a central installation hole on the inner surface of the piston top by virtue of a nut and a lead screw; a control valve element is provided with a decompression longitudinal hole for communicating the space of the installation hole and the central hole of the valve element, thereby reducing the pressure generated by the leakage of little hydraulic oil, and reducing the operating force of the control valve element. A drive rod on the lower portion is rotated, the valve element moves axially up and down relative to the outer piston, and a relative relation of the valve sleeve and the valve element has three states: (1) the sealing sections of the valve sleeve seal the hydraulic oil inlet and the hydraulic oil outlet, so that liquid between the upper hydraulic cylinder and the lower hydraulic cylinder does not flow; (2) the valve element moves up, the upper annular groove of the valve sleeve is communicated with the liquid inlet of the valve element, the middle annular groove of the valve sleeve is communicated with the upper hydraulic cylinder, the hydraulic oil of the upper hydraulic cylinder is discharged, the pressure of the upper hydraulic cylinder is decreased, when the pressure of the central hole of the valve element is higher than the lower hydraulic cylinder, the liquid in the valve element flows into the lower hydraulic cylinder via the check valve, and the inner piston moves upwards, so that a total length of the piston is reduced, along with the upward movement of the inner piston, the sealing sections of the valve sleeve seal the hydraulic oil inlet and the hydraulic oil outlet, and the liquid of the two hydraulic cylinders does not flow; (3) the valve element moves down, the middle annular groove of the valve sleeve is communicated with the liquid Inlet of the valve element, the lower annular groove of the valve sleeve is communicated with the upper hydraulic cylinder, the hydraulic oil of the lower hydraulic cylinder is discharged, the pressure of the lower hydraulic cylinder is decreased, when the pressure of the central hole of the valve element is higher than the upper hydraulic cylinder, the liquid in the valve element flows into the upper hydraulic cylinder via the check valve, and the inner piston moves downwards, so that a total length of the piston is increased, along with the downward movement of the inner piston, the sealing sections of the valve sleeve seal the hydraulic oil inlet and the hydraulic oil outlet, and the liquid of the two hydraulic cylinders does not flow.

Embodiment 4 of a slide-valve-type directional control valve installed on a variable compression ratio piston is: a two-groove slide-sleeve three-position four-way external-liquid-type variable compression ratio piston control valve; a main valve structure is equivalent to a two-groove valve sleeve three-position four-way slide valve; a valve sleeve is provided with two annular grooves; an upper annular groove is an upper cylinder annular groove communicated with the upper hydraulic cylinder; a lower annular groove is a lower cylinder lower annular groove communicated with the lower hydraulic cylinder; a valve element is of a hollow structure; the valve element is provided with two groups of hydraulic oil inlets and a group of hydraulic oil outlets; the liquid hydraulic oil inflow holes are provided at two ends, and hydraulic oil outflow holes are provided in the middle; circlip-type annular grooves are provided on the outer circumference of the hydraulic oil inlets and provided with circlip-type horizontal moving check valves; the flow direction of the check valve is from the center of the valve element to the outside, and the check valve is communicated with a central hole of the valve element; a sealing section is provided between the two annular grooves on the valve sleeve; valve element sealing sections are provided among three groups of flow passages of the valve element; the height of the valve sleeve sealing section is greater than or equal to the height of the hydraulic oil outflow hole, and the heights of the valve element sealing sections are greater than or equal to the heights of the valve sleeve annular grooves; the valve element is installed in the central installation hole on the inner surface of the piston top by virtue of a nut and a lead screw; a control valve element is provided with a decompression longitudinal hole for communicating the space of the installation hole and the central hole of the valve element, thereby reducing the pressure generated by the leakage of little hydraulic oil, and reducing the operating force of the control valve element; a drive rod on the lower portion is rotated, the valve element moves axially up and down relative to the outer piston, and a relative relation of the valve sleeve and the valve element has three states: (1) the sealing sections of the valve sleeve seal the through hole or the annular grooves, so that the liquid between the upper hydraulic cylinder and the lower hydraulic cylinder does not flow; (2) the valve element moves up, the upper annular groove of the valve sleeve is communicated with the middle liquid outlet of the valve element, the lower annular groove of the valve sleeve is communicated with the lower annular groove of the valve element, the hydraulic oil of the upper hydraulic cylinder is discharged, the pressure of the upper hydraulic cylinder is decreased, when the pressure of the central hole of the valve element is higher than the lower hydraulic cylinder, the liquid in the valve element flows into the lower hydraulic cylinder via the check valve, and the inner piston moves upwards, so that a total length of the piston is reduced, and along with the upward movement of the inner piston, the sealing sections of the valve sleeve seal the hydraulic oil inlet and the hydraulic oil outlet, and the liquid of the two hydraulic cylinders does not flow; (3) the valve element moves down, the upper annular groove of the valve sleeve is communicated with the upper annular groove of the valve element, the lower annular groove of the valve sleeve is communicated with the middle hydraulic outlet, the hydraulic oil of the lower hydraulic cylinder is discharged, the pressure of the lower hydraulic cylinder is decreased, when the pressure of the central hole of the valve element is higher than the upper hydraulic cylinder, the liquid in the valve element flows into the upper hydraulic cylinder via the check valve, and the inner piston moves down, so that a total length of the piston is increased, and along with the downward movement of the inner piston, the sealing sections of the valve sleeve seal the hydraulic oil inlet and the hydraulic oil outlet, and the liquid of the two hydraulic cylinders does not flow.

Embodiment 5 of a slide-valve-type directional control valve installed on a variable compression ratio piston is: a three-position four-way spiral-groove longitudinally-distributed variable compression ratio piston control valve; a main control valve structure is equivalent to a three-groove valve sleeve three-position four-way slide valve; a valve sleeve is provided with three groups of longitudinal grooves; a middle longitudinal groove is an upper cylinder longitudinal groove communicated with the upper hydraulic cylinder; a lower cylinder upper longitudinal groove and a lower cylinder lower longitudinal groove are communicated with the lower hydraulic cylinder; a valve element is a structure with a central hole; the top and the bottom of the outer cylindrical surface of the valve element are respectively provided with a group of spiral grooves; an upper spiral groove is communicated with a hydraulic oil inlet and communicated with the central hole of the valve element; a lower spiral groove is communicated with a hydraulic oil outlet and communicated with an external space through a longitudinal hole; two sealing sections are provided between the upper longitudinal annular grooves of the valve sleeve; at an intersected surface of the valve sleeve longitudinal groove and the spiral groove, when the valve sleeve sealing sections are disposed in the middle of the spiral groove, the sealing sections can completely seal the spiral groove; the valve element is installed in the valve sleeve in a sliding manner; the valve sleeve is fixed on the inner piston; the valve element is installed in a central installation hole on the inner surface of the piston top by virtue of a positioning nut and a positioning step; a circlip-type horizontal check valve is installed on the top of a drive rod, a control valve element is provided with a decompression longitudinal hole for communicating the space of the installation hole and the exterior, and the decompression longitudinal hole is not communicated with the central hole, thereby reducing the pressure generated by the leakage of little hydraulic oil, and reducing the operating force of the control valve element. The drive rod on the lower portion is rotated, the valve element rotates relative to the outer piston, and a relative relation of the valve sleeve and the valve element has three states: (1) the sealing sections of the valve sleeve seal the spiral grooves, so that the liquid between the upper hydraulic cylinder and the lower hydraulic cylinder does not flow; (2) the upper spiral groove of the valve element is communicated with the upper longitudinal groove of the valve sleeve, the lower spiral groove of the valve element is communicated with the middle longitudinal groove of the valve sleeve, at the moment, the lower hydraulic cylinder is communicated with a liquid inlet, the upper hydraulic cylinder is communicated with a liquid outlet, the hydraulic oil of the upper hydraulic cylinder is discharged, the pressure of the upper hydraulic cylinder is decreased, when the liquid pressure of the drive rod is higher than the lower hydraulic cylinder, the liquid in the valve element flows into the lower hydraulic cylinder, and the inner piston moves up, so that a total length of the piston is reduced, and along with the upward movement of the inner piston, the sealing sections of the valve sleeve seal the hydraulic oil inlet and the hydraulic oil outlet, and the liquid of the two hydraulic cylinders does not flow; (3) the upper spiral groove of the valve element is communicated with the middle longitudinal groove of the valve sleeve, the lower spiral groove of the valve element is communicated with the lower longitudinal groove of the valve sleeve, at the moment, the lower hydraulic cylinder is communicated with the liquid outlet, the upper hydraulic cylinder is communicated with the liquid inlet, the hydraulic oil of the lower hydraulic cylinder is discharged, the pressure of the lower hydraulic cylinder is decreased, when the pressure of the central hole of the valve element is higher than that of the upper hydraulic cylinder, the liquid in the valve element flows into the upper hydraulic cylinder via the check valve, and the inner piston moves downwards, so that a total length of the piston is increased, and along with the downward movement of the inner piston, the sealing sections of the valve sleeve seal the hydraulic oil inlet and the hydraulic oil outlet, and the liquid of the two hydraulic cylinders does not flow.

Embodiment 6 of a slide-valve-type directional control valve installed on a variable compression ratio piston: a three-position four-way spiral-groove circumferentially-distributed variable compression ratio piston control valve; a valve sleeve is provided with four groups of longitudinal grooves, and the top and the bottom of the valve sleeve are respectively provided with two groups of longitudinal grooves; the upper longitudinal grooves are divided into an upper cylinder upper longitudinal groove communicated with the upper hydraulic cylinder and a lower cylinder upper longitudinal groove communicated with the lower hydraulic cylinder; the lower longitudinal grooves are divided into an upper cylinder lower longitudinal groove communicated with the upper hydraulic cylinder and a lower cylinder lower longitudinal groove communicated with the lower hydraulic cylinder, two groups of spiral grooves are arranged on the circumference of the outer cylindrical surface of the valve element, one group of spiral grooves are hydraulic oil inlets communicated with a central hole of the valve element, and the other group of spiral grooves is hydraulic oil outlets communicated with the external space; two sealing sections are provided between the upper longitudinal annular grooves of the valve sleeve; at an intersected surface of the valve sleeve longitudinal groove and the spiral groove, when the valve sleeve sealing sections are provided in the middle of the spiral grooves, the sealing sections can completely seal the spiral grooves; the valve element is installed in the valve sleeve in a sliding manner, the directions of the lower cylinder upper longitudinal groove and the upper cylinder lower longitudinal groove correspond to the hydraulic oil inlets of the valve element, and the directions of the lower cylinder lower longitudinal groove and the upper cylinder upper longitudinal groove correspond to the hydraulic oil inlets of the valve element; the valve sleeve is fixed on the inner piston, and the valve element is installed in the central installation hole on the inner surface of the piston top by virtue of a positioning nut and a positioning step; a check valve is installed on the top of a drive rod; a control valve element is provided with a longitudinal hole for communicating the space of the installation hole and the exterior, and the longitudinal hole is not communicated with the central hole, thereby eliminating the pressure generated by the leakage of little hydraulic oil, and reducing the operating force of the control valve element; the drive rod on the lower portion is rotated, the valve element rotates relative to the outer piston, and a relative relation of the valve sleeve and the valve element has three states: (1) the sealing sections of the valve sleeve seal the spiral grooves, so that the liquid between the upper hydraulic cylinder and the lower hydraulic cylinder does not flow; (2) the outflow spiral groove of the valve element is communicated with the upper cylinder longitudinal groove on the upper portion of the valve sleeve, the inflow spiral groove of the valve element is communicated with the lower cylinder longitudinal groove on the middle lower portion of the valve sleeve, at the moment, at the moment, the lower hydraulic cylinder is communicated with a liquid inlet, the upper hydraulic cylinder is communicated with a liquid outlet, the hydraulic oil of the upper hydraulic cylinder is discharged, the pressure of the upper hydraulic cylinder is decreased, when the liquid pressure of the drive rod is higher than the lower hydraulic cylinder, the liquid in the valve element flows into the lower hydraulic cylinder, and the inner piston moves upwards, so that a total length of the piston is reduced, and along with the upward movement of the inner piston, the sealing sections of the valve sleeve seal the hydraulic oil inlet and the hydraulic oil outlet, and the liquid of the two hydraulic cylinders does not flow; (3) the outflow spiral groove of the valve element is communicated with the lower cylinder longitudinal groove on the lower portion of the valve sleeve, the inflow spiral groove of the valve element is communicated with the upper cylinder longitudinal groove on the upper portion of the valve sleeve, at the moment, the lower hydraulic cylinder is communicated with the liquid outlet, the upper hydraulic cylinder is communicated with the liquid inlet, the hydraulic oil of the lower hydraulic cylinder is discharged, the pressure of the lower hydraulic cylinder is decreased, when the pressure of the central hole of the valve element is higher than that of the upper hydraulic cylinder, the liquid in the valve element flows into the upper hydraulic cylinder via the check valve, and the inner piston moves downwards, so that a total length of the piston is increased, and along with the downward movement of the inner piston, the sealing sections of the valve sleeve seal the hydraulic oil inlet and the hydraulic oil outlet, and the liquid of the two hydraulic cylinders does not flow.

The control valve drive rod of the variable compression ratio piston in the double-crankshaft engine capable of changing the compression ratio is of a slide-sleeve type, and semicircular spline grooves are uniformly distributed on an upper drive rod; a lower drive sleeve is an annular casing pipe, holes corresponding to the semicircular spline grooves of the upper drive rod are uniformly distributed on the upper portion, and the diameter of each hole is identical to the diameter of each semicircular spline groove of the upper drive rod; a steel ball is installed in each hole of the lower drive sleeve; each steel ball is half exposed out of the drive sleeve, and the exposed steel ball is installed in the semicircular spline groove of the drive rod on the upper portion; and the steel ball in the hole of the drive slide sleeve of the control valve is replaced by a round-end rod with a circular-arc end and a screw thread so as to simplify the structure, and the steel ball in the control valve sleeve may also be changed to an elongated slide key so as to increase a contact area and to reduce the abrasion.

A heat insulation coating is smeared on the upper surface of a piston ring of the three-position three-way self-pumping variable compression ratio piston in the double-crankshaft engine capable of changing the compression ratio (embodiment 1 and embodiment 2), so as to reduce the heat transferred from the air cylinder to the piston, or a way identical to a cooling oil passage of a diesel engine is adopted to cool the piston.

The top center of the outer piston of the three-position four-way variable compression ratio piston in the double-crankshaft engine capable of changing the compression ratio (embodiment 3, embodiment 4, embodiment 5 and embodiment 6) is provided with an oil passage communicated with the central hole of the valve element, the oil passage at the top center of the outer piston is communicated with an outward-radiation oil passage, the radiation outer circumference is communicated with the annular oil passage, and the annular oil passage discharges oil through the longitudinal hole.

Since the variable compression ratio piston drive valve is a slide-valve type; a fitting gap is formed between the valve element and the valve sleeve; in order to reduce the leakage of the control valve, the optimized control valve element and valve sleeve adopt a hole and groove type, i.e. when the valve element is provided with the hole, the slide sleeve is provided with the groove, and conversely, when the valve element is provided with the groove, the valve sleeve is provided with the hole, so that after the control valve is closed, the leakage is reduced compared with the type that both the valve element and the valve sleeve are provided with the grooves.

The present invention has the beneficial effects that: the double-acting hydraulic cylinder-type variable compression ratio piston is combined with the double-crankshaft engine, so that the machining and installation difficulty of the variable compression ratio piston is reduced; by means of a scattered flywheel structure, the switching of the crankshafts between the energy input and output is reduced, and the severe working state of the coupled gears is improved; compared with the self-pumping variable compression ratio piston (2012204098128) in early days, by arranging the safety device, the safety danger caused by the increasing temperature of working liquid in the variable piston when the engine is started can be avoided; the designed circlip-type horizontal moving check valve eliminates the influence of the acceleration on the opening and closing of the check valve during the operating process of the engine; the added three-position four-way control-valve external-liquid-type variable compression ratio piton accelerates the exchange of the liquid, thereby preventing the problem that the working liquid goes bad due to the insufficient exchange of the working liquid, also solving the problem that the check valve cannot be reliably opened due to the insufficient pressure difference of the two hydraulic cylinders in the variable compression ratio piston when the engine runs at a low speed, and improving the controllability of the variable compression ratio piston.

DESCRIPTION OF THE DRAWINGS

The present utility model is further described below in combination with drawings and embodiments.

DETAILED DESCRIPTION OF PREFERRED EMBODIMENTS

Figure 1:
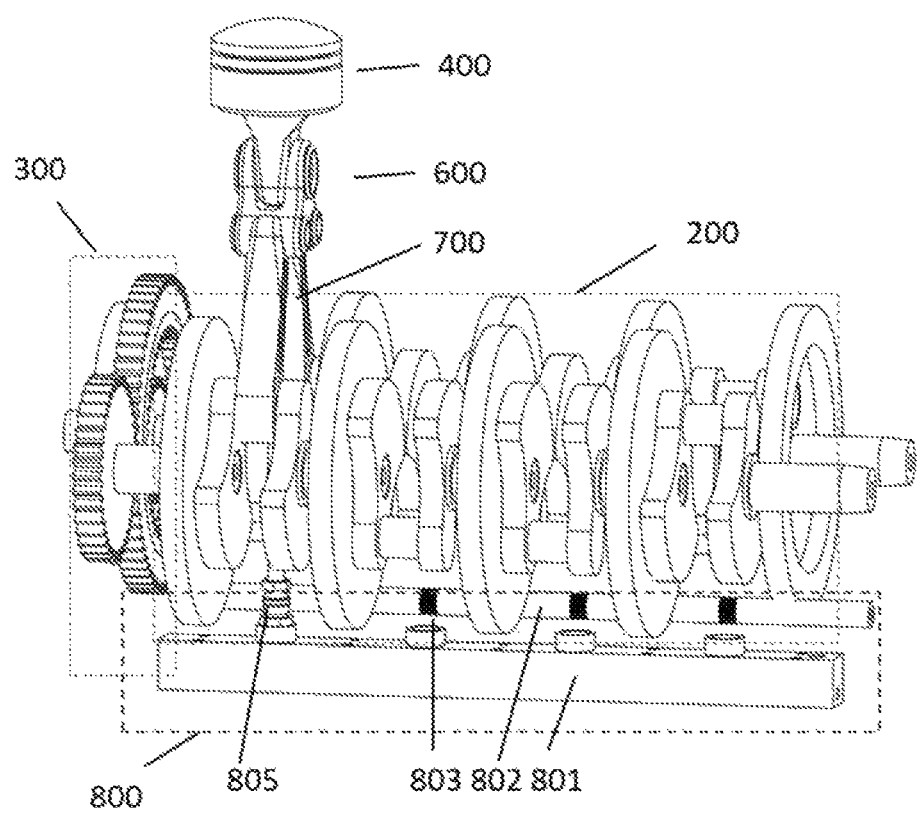
FIG. 1 is a three-dimensional diagram showing a double-crankshaft variable compression ratio engine, a crankshaft connecting rod and a piston.
Figure 2:
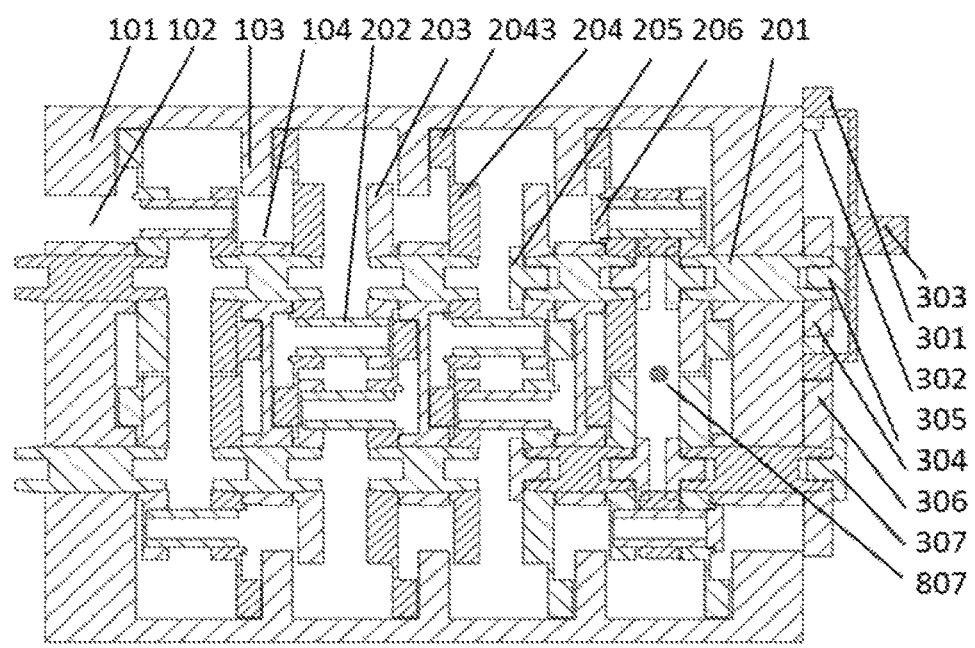
FIG. 2 is a horizontal section diagram showing a double-crankshaft variable compression ratio engine along a crankshaft main shaft.
Figure 3:
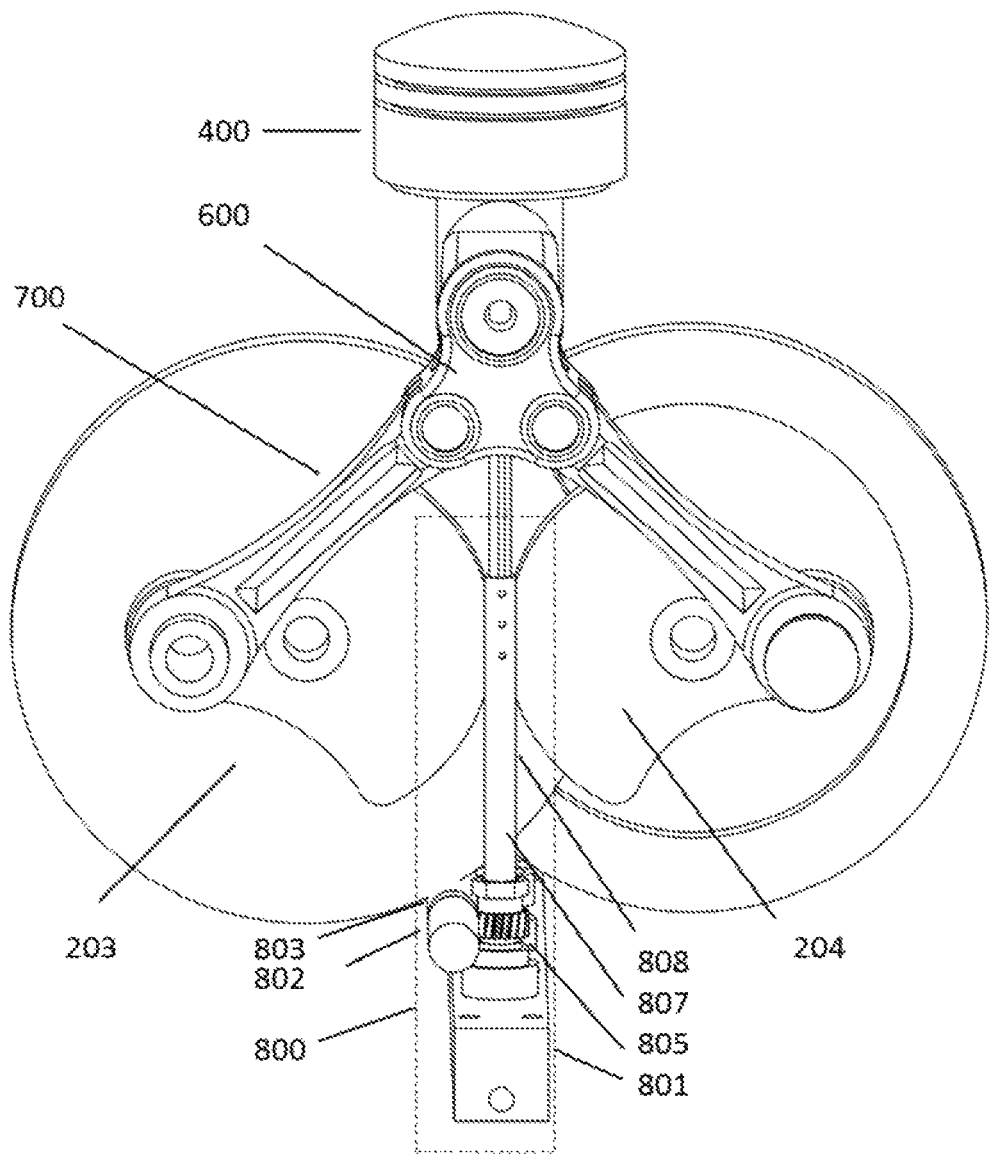
FIG. 3 is a diagram showing a location relationship of a double-crankshaft variable compression ratio engine piston, a connecting rod, a crankshaft and a piston drive mechanism.
Figure 4:
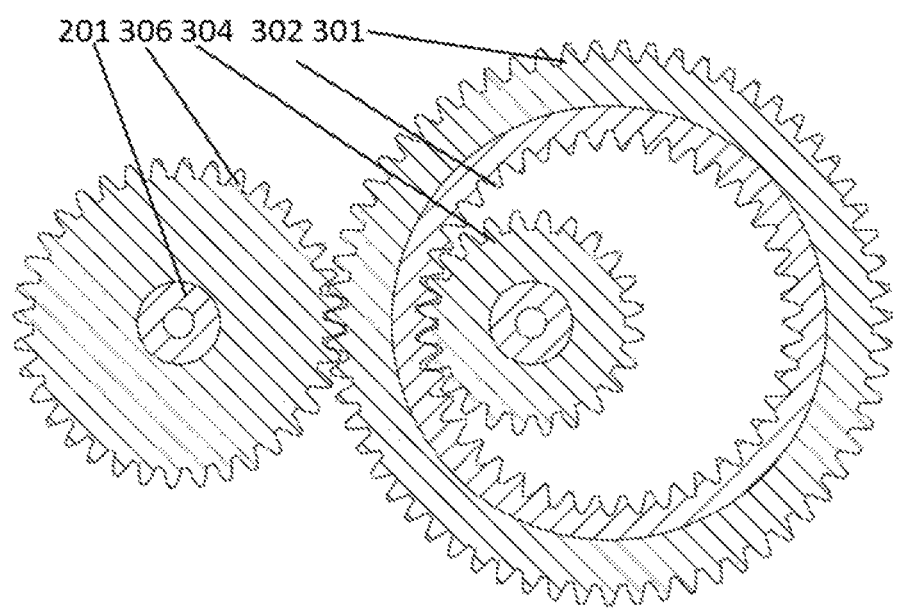
FIG. 4 is a diagram showing a coupling location relationship of an inner gear ring and an outer gear ring of double crankshafts.

FIG. 1-FIG. 3 show an overall structure of a crankshaft connecting rod and piston of a double-crankshaft variable compression ratio engine; in order to make the diagrams simple and clear, only one piston and connecting rod mechanism is drawn; the overall structure of the double-crankshaft variable compression ratio crankshaft connecting rod and piston is as follows: two sets of parallel flywheel crankshafts (200) are installed on a cylinder body (101); the two sets of parallel flywheel crankshafts are coupled together by virtue of gears (300); a three-shaft connector (600) is used for connecting the lower portion of a variable piston (400) and small ends of two connecting rods (700) by virtue of a rotating and sliding way of shafts and holes; big ends of the two connecting rods are installed on a crankshaft connecting rod shaft in a rotating and sliding manner, and a variable piston drive mechanism (800) is installed between the two connecting rods.

The cylinder body (101) is divided by three middle cylinder body separation plates (103) into four spaces; two rows of main shaft installation holes (104) are distributed on the middle cylinder body separation plates (103) and two end plates; a crankshaft arm end with a flywheel of the main shaft installation hole (104) is of a sleeve structure; a connecting rod main shaft installation hole (102) is arranged on a position of the cylinder body corresponding to a connecting rod main shaft and used for installing the connecting rod main shaft and an anti-thrust mechanism; the portion of the cylinder body at the main shaft may be manufactured by two portions and may also be manufactured as an integrated type according to the present embodiment.

A main shaft (201) with a taper angle on two ends is in interference fit with a central hole (2031) of a flywheel-free crankshaft arm (203) and with a central hole (2041) of a flywheel crankshaft arm (204) by virtue of main shaft tightening screws (205); a connecting rod shaft hole (2032) of the flywheel-free crankshaft arm (203) and a connecting rod shaft hole (2042) of the flywheel crankshaft arm (204) are connected together by virtue of a connecting rod main shaft (202), while the fitting way may be in interference fit, and may also be in sliding fit, and the sliding fit is selected in the present embodiment; the flywheel-free crankshaft arm (203) (FIG. 2) is of a blind-hole type, while a flywheel (2043) of the flywheel crankshaft arm (204) has thick edges and a thin middle portion; an annular gap (105) is reserved between the flywheel and each cylinder body separation plate (103); an anti-thrust screw (205) is installed on the flywheel crankshaft arm to form a complete crankshaft; and the crankshaft with the crankshaft arms installed oppositely is installed in the installation hole (104) of the cylinder body.

A gear (304) and a gear (306) are respectively fixed on the main shaft through tightening screws (305), (307), an outer gear ring (301) and an inner gear ring (302) are fixed together to form an inner and outer gear ring or are integrated, the outer gear ring (301) is engaged with the gear (306), the inner gear ring (302) is engaged with the gear (304), a tooth ratio of the outer gear ring (301) to the gear (306) is equal to a tooth ratio of the inner gear ring (302) to the gear (304), and the inner and outer gear rings are provided with a power output shaft (303).

Figure 5:
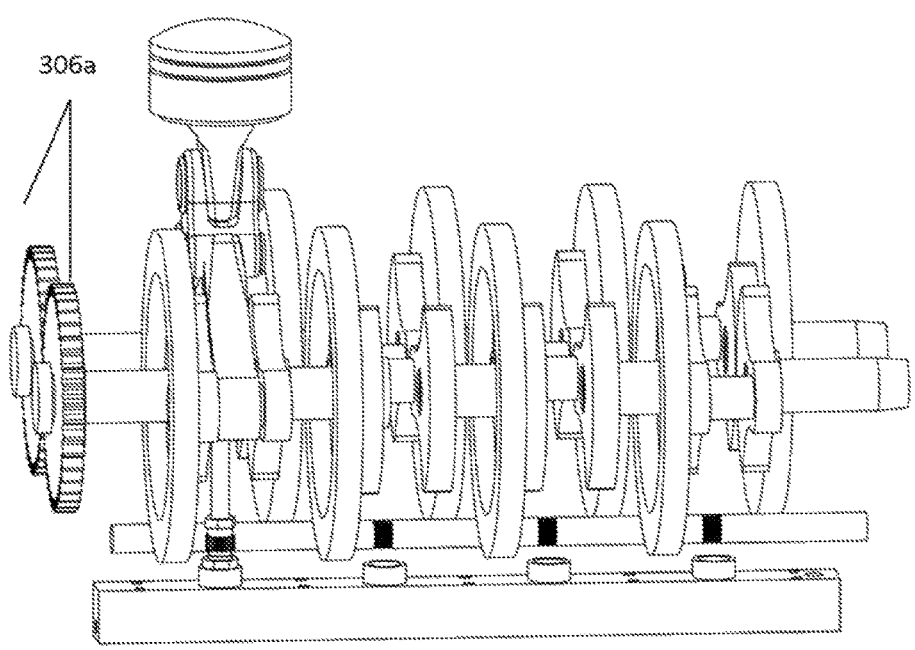
FIG. 5 is a schematic diagram showing simplified coupling of gears of a double-crankshaft variable compression ratio engine.

FIG. 5 is a schematic diagram showing the simplified coupling of the gears of the double-crankshaft variable compression ratio engine; and the coupling of the inner gear ring and the outer gear ring is simplified to be the coupling of two identical gears.

Figure 6:
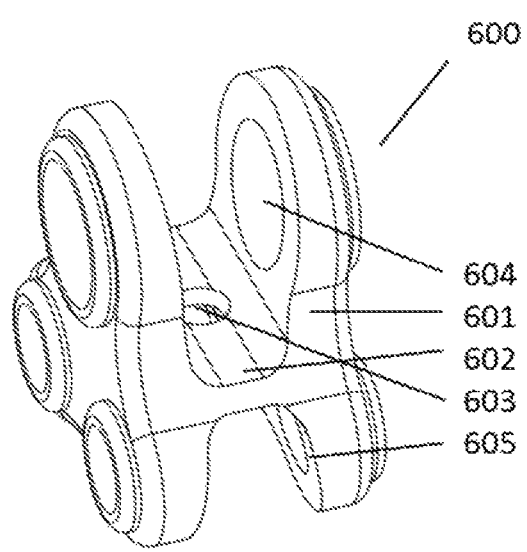
FIG. 6 is a perspective diagram showing a three-shaft-type connector.

FIG. 6 shows a structure of a three-hole connector (600); the three-hole connector is formed by integrating two angular plates (601) respectively with three shaft holes by virtue of a connecting plate (602); a through hole (603) for a valve element drive rod (808) is formed in the middle of the connecting plate (602); a larger shaft hole is a piston pin hole (604), two smaller shaft holes are connecting rod small-end shaft holes (605), and preferably, an opening portion in the middle of the three-hole connector is of a structure enlarged outwards.

Figure 7:
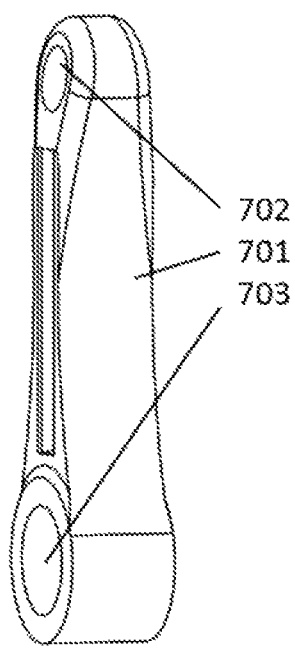
FIG. 7 is a perspective diagram showing a connecting rod.

FIG. 7 shows a structure of a connecting rod; the structure of the connecting rod is similar to that of an ordinary connecting rod; the connecting rod is formed by a connecting rod arm (701), a connecting rod small-end shaft hole (702) and a connecting rod big-end shaft hole (703); and the optimized connecting rod big end is of an integrated type, and the connecting rod small end is of a structure gradually thinned outwards.

Figure 8:
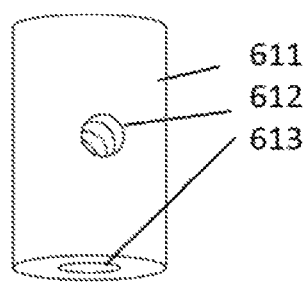
FIG. 8 is a perspective diagram showing a piston pin.

FIG. 8 shows a structure of a piston pin; and the piston pin is divided into a piston pin main body (611), a weight-reducing hole (612) and a through hole (613) for the valve element drive rod (808).

Figure 9:
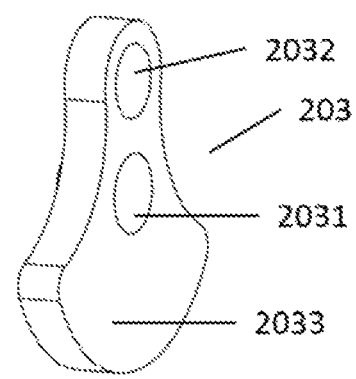
FIG. 9 is a perspective diagram showing a flywheel-free crankshaft arm.

FIG. 9 shows a structure of a flywheel-free crankshaft arm (203); the flywheel-free crankshaft arm is provided with a main shaft connecting hole (2031), a connecting rod main shaft hole (2032) and an eccentric weight (2033).

Figure 10:
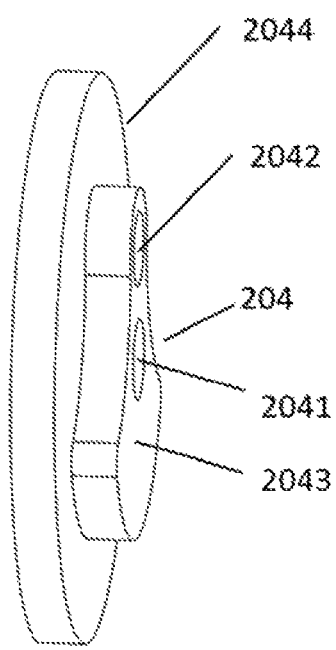
FIG. 10 is a perspective diagram showing a crankshaft arm with a flywheel.

FIG. 10 shows a structure of a flywheel crankshaft arm (204); the flywheel crankshaft arm is provided with a main shaft connecting hole (2041), a connecting rod main shaft hole (2042) and an eccentric weight (2043), and a flywheel (2033) and the crankshaft arm are integrated.

Figure 11:
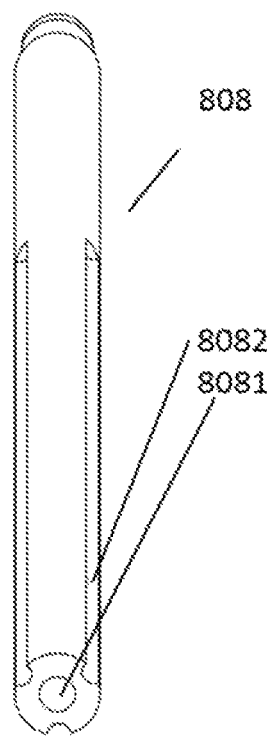
FIG. 11 shows a drive rod on a variable compression ratio piston control valve.
Figure 12:
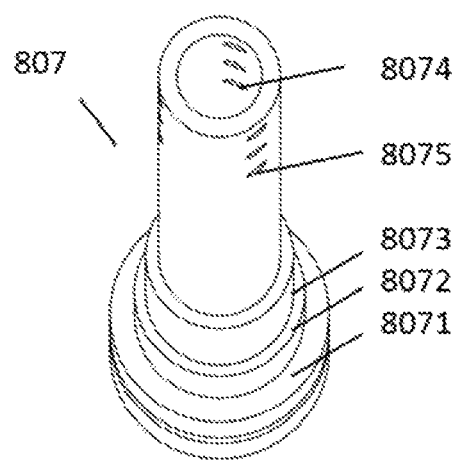
FIG. 12 shows a drive slide sleeve on a variable compression ratio piston control valve.
Figure 13:
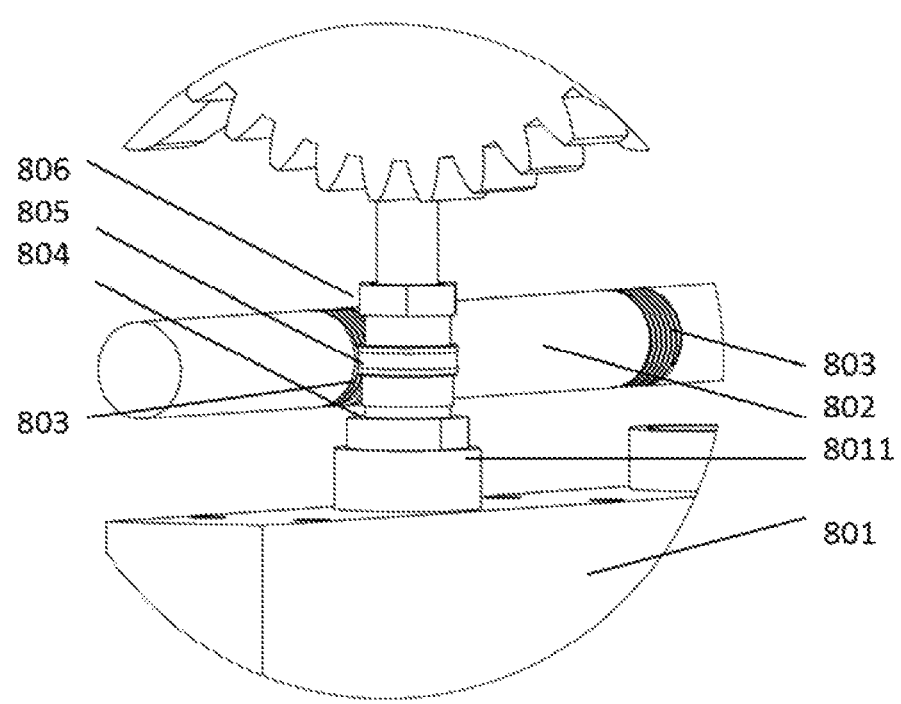
FIG. 13 is a local diagram showing a drive and switch mechanism of a variable compression ratio piston control valve.
Figure 14:
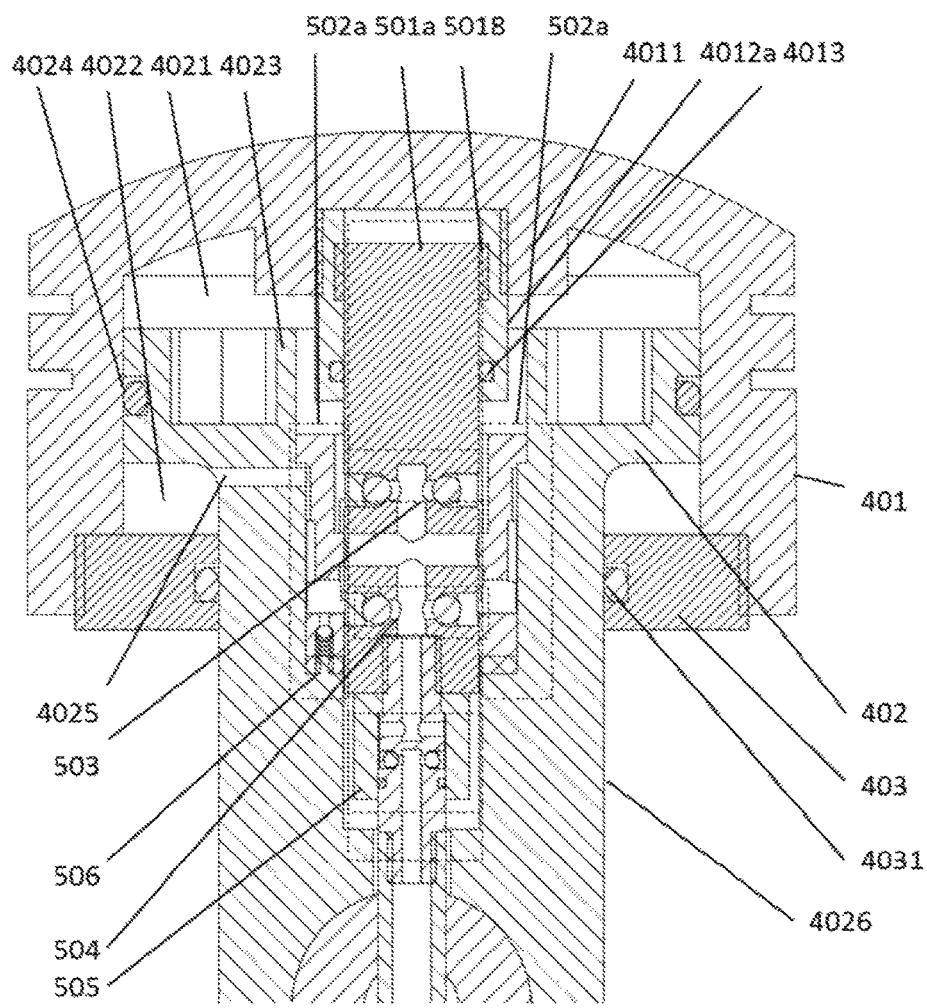
FIG. 14 is a sectional view showing a three-position three-way axial moving self-pumping variable compression ratio piston.
Figure 15:
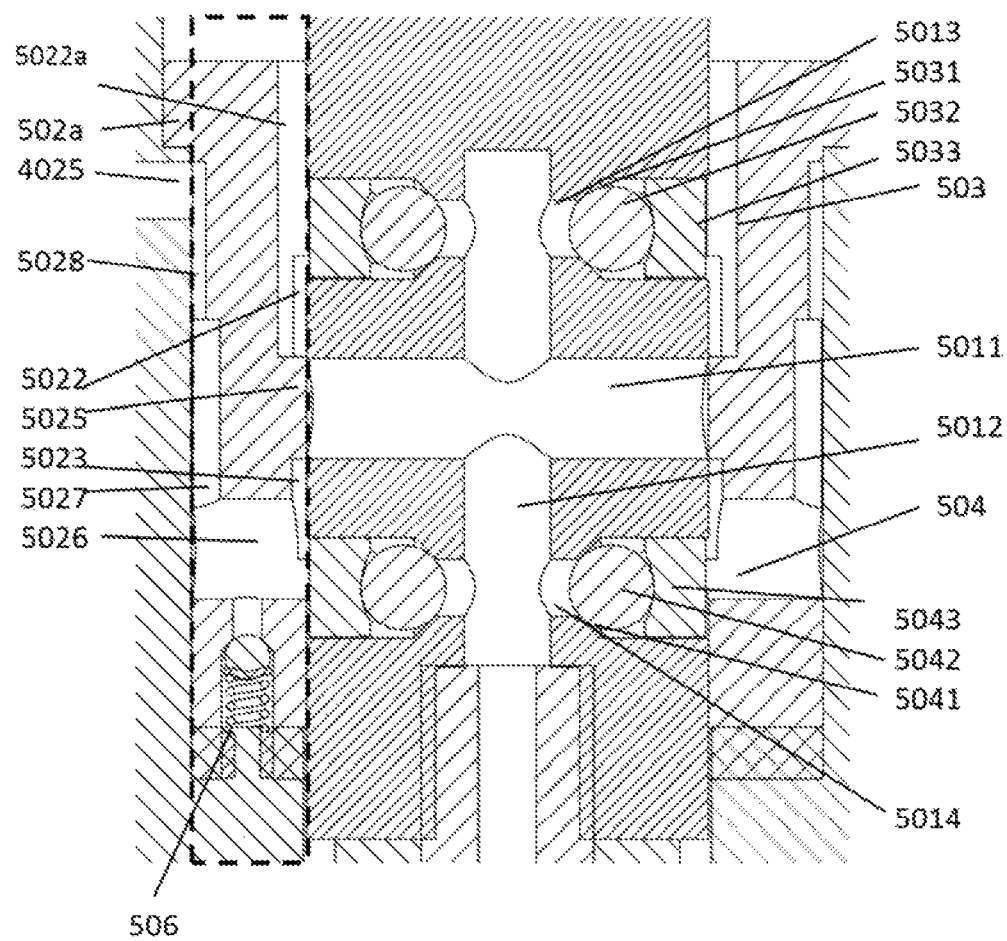
FIG. 15 is a sectional view showing a three-position three-way axial moving self-pumping variable compression ratio piston control valve.
Figure 16:
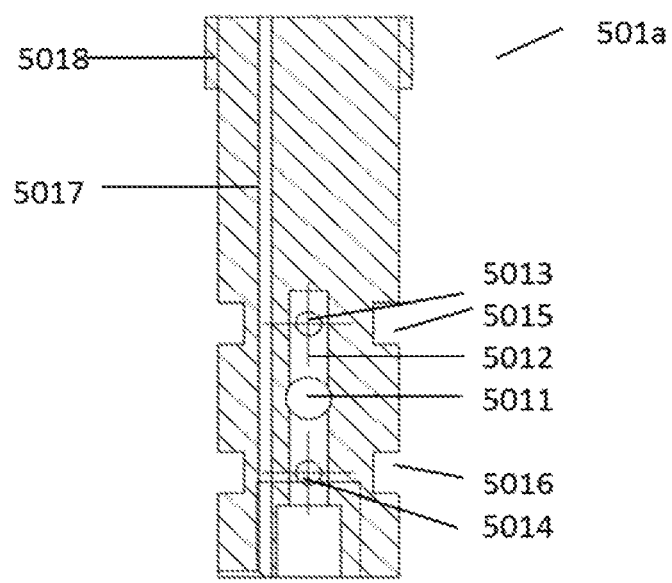
FIG. 16 is a structural diagram showing a three-position three-way axial moving self-pumping variable compression ratio piston control valve element.
Figure 17:
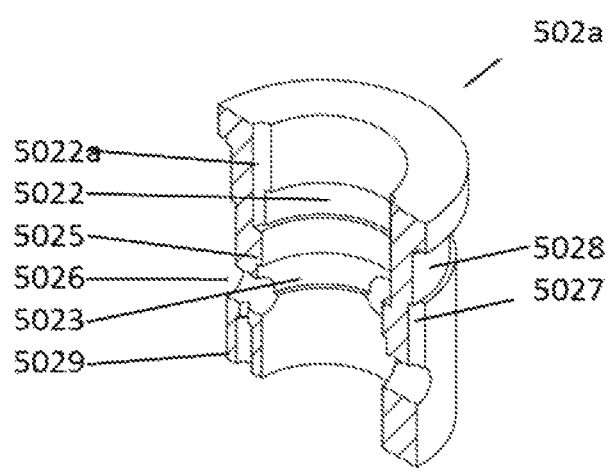
FIG. 17 is a structural diagram showing a three-position three-way axial moving self-pumping variable compression ratio piston control valve sleeve.

FIG. 11-FIG. 13 show a structure of a variable compression ratio piston valve element steering drive mechanism, and the cooperation with relevant parts refers to FIG. 1 and FIG. 3; in the drawings, an upper drive rod (808) is of a tubular structure with a central through hole (8081), and circular-arc grooves (8082) are uniformly distributed from the middle-upper portion to the lower portion of the upper drive rod (808); a lower drive slide sleeve (807) is of a tubular structure with a drive rod positioning step (8071), a turbine positioning step (8072) and a turbine tightening screw thread (8073) and with a central through hole (8074); steel ball (or round-end rod) installation holes (8075) corresponding to the circular-arc grooves (8082) on the upper drive rod (808) are distributed on the top of the lower drive slide sleeve (807); the diameter of each circular-arc groove (8082) is identical to that of each installation hole (8075); steel balls or round-end rods in the installation holes (8075) are in sliding fit with the circular-arc grooves (8082); and the upper drive rod (808) can slide axially in the lower drive slide sleeve (807), and when the lower drive slide sleeve (807) is rotated, the upper drive rod (808) also rotates.

A hydraulic oil rail (801) is of a tubular structure with a central hole and is horizontally installed on the bottom of the cylinder body; a branch tube (8011) facing upwards is respectively arranged on a position corresponding to the center of each piston; the branch tube (8011) is also an installation sleeve of the lower drive slide sleeve (807); the lower drive slide sleeve (807) is installed in the branch tube (8011); the lower drive slide sleeve (807) is in rotating sliding fit with the branch tube (8011) and is positioned by virtue of the positioning step (8071) and the positioning screw (804); a turbine (805) is installed on the lower drive slide sleeve (807) and positioned by virtue of the positioning step (8071); the tightening screw (806) is installed on the turbine tightening screw thread (8073) and compresses and fixes the turbine (805); worms (803) with a quantity same with that of the pistons are distributed on a transverse drive rod (802) and are horizontally installed on the cylinder body; and the worms (803) are engaged with the turbine (805), and the control valve element can be driven to rotate by rotating the transverse drive rod (802).

The hydraulic oil rail (801) is communicated with lubricating oil of the engine, and the lubricating oil enters the valve element central hole (5012) through the hydraulic oil rail (801), the lower drive slide sleeve (807) and the upper drive rod (808).

The variable compression ratio piston valve element steering drive mechanism of the present embodiment adopts a turbine and worm transmission way; and according to a similar principle, the turbine and the worm are replaced by a gear and a worm, or replaced by a pair of bevel gears, the effect of the present embodiment can also be realized, thus is not repeated herein.

Embodiment 1 of a control valve: FIG. 14-FIG. 18 show a structure of a three-position three-way axial moving self-pumping variable compression ratio piston; the variable compression ratio piston is integrally of a double-acting hydraulic cylinder, the hydraulic cylinder comprises an outer piston (401) which is a cylinder body of the hydraulic cylinder; a hydraulic cylinder head (401) is fixed at an opening of the outer piston (401); the hydraulic cylinder is divided by an inner piston (402) into an upper hydraulic cylinder (4021) and a lower hydraulic cylinder (4022); the inner piston (402) is provided with a sealing ring (4024); the hydraulic cylinder head (401) is a cover plate with a central hole; an inner piston rod (4026) is installed to the hydraulic cylinder head in a sliding manner; a piston rod sealing ring (4031) is installed in an inner hole to realize the seal between the inner piston rod (4026) and the hydraulic cylinder head; the inner piston is provided with a lower hydraulic cylinder oil hole (4025) communicated with a lower cylinder oil passage of a control valve sleeve; the inner piston is provided with an installation hole (4023); the control valve sleeve (502*a*) is fixed in an installation hole (4023) arranged on the inner piston; a control valve element installation hole (4011) is arranged on the inner surface of the top of the outer piston; a lead screw nut (4012) of the axis-moving control valve element (501*a*) is fixed in the valve element installation hole (4011); a lead screw nut (4012) is installed on the control valve element lead screw (5018), and a sealing ring (4013) is arranged between the lead screw nut (4012) and the control valve element.

A control valve element (501*b*) of the three-position three-way axial moving self-pumping variable compression ratio piston is of a tubular structure with a central hole (5012); a group of valve element oil outlets (5011) is distributed in the middle of the control valve element in the radial direction; a group of valve element upper oil inlets (5013) is distributed at the upper end in the radial direction, and a group of valve element lower oil inlets (5014) is distributed at the lower end; a circlip-type spring groove (5015) is distributed at the outer circumference of the upper oil inlet (5013) of the control valve element, and a circlip-type spring groove (5016) is distributed at the outer circumference of the lower oil inlet (5013) of the control valve element; a slide-sleeve upper cylinder annular groove (5022*a*) and a valve sleeve lower cylinder lower annular groove (5023) are arranged in an inner hole of the control valve sleeve (502*a*); the valve sleeve upper cylinder annular groove (5022) is communicated with the upper hydraulic cylinder (4021) through a longitudinal groove (5022*a*), and the valve sleeve lower cylinder lower annular groove (5023) is communicated with the lower hydraulic cylinder through oil passages (5026, 5027, 5028, 4025); a safety valve (506) is installed in a safety valve installation hole (5029) on the valve sleeve, an inlet of the safety valve is communicated with the lower hydraulic cylinder, an outlet of the safety valve extends out of the piston, and the opening pressure of the safety valve (506) is higher than the working pressure of the lower hydraulic cylinder when the engine is at a highest rotation speed; a valve sleeve lower sealing section (5025) is provided between the upper cylinder annular groove (5022) and the lower cylinder lower annular groove (5023), and the height of the valve sleeve lower sealing section (5025) is greater than or equal to the height of the valve element oil outlet (5011); and the upper oil inlet (5013) of the control valve element and the lower oil inlet (5014) of the control valve element are always communicated with the valve sleeve upper cylinder annular groove (5022) and the valve sleeve lower cylinder lower annular groove (5023) during the working process.

The circlip-type horizontal moving check valves (503, 504) are installed in the upper and lower oil inlets (5013, 5014) of the control valve element, and the circlip-type horizontal moving check valves (503, 504) respectively consist of a valve seat (5031, 5041), a valve element (5032, 5042) and a circlip-type spring (5033, 5034).

Figure 18:
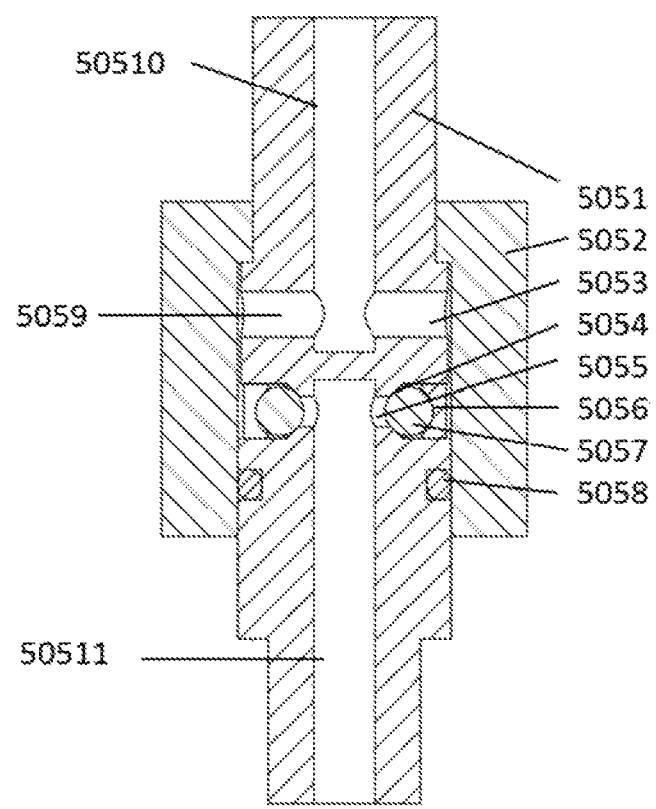
FIG. 18 shows a circlip-type external-liquid input check valve.
Figure 19:
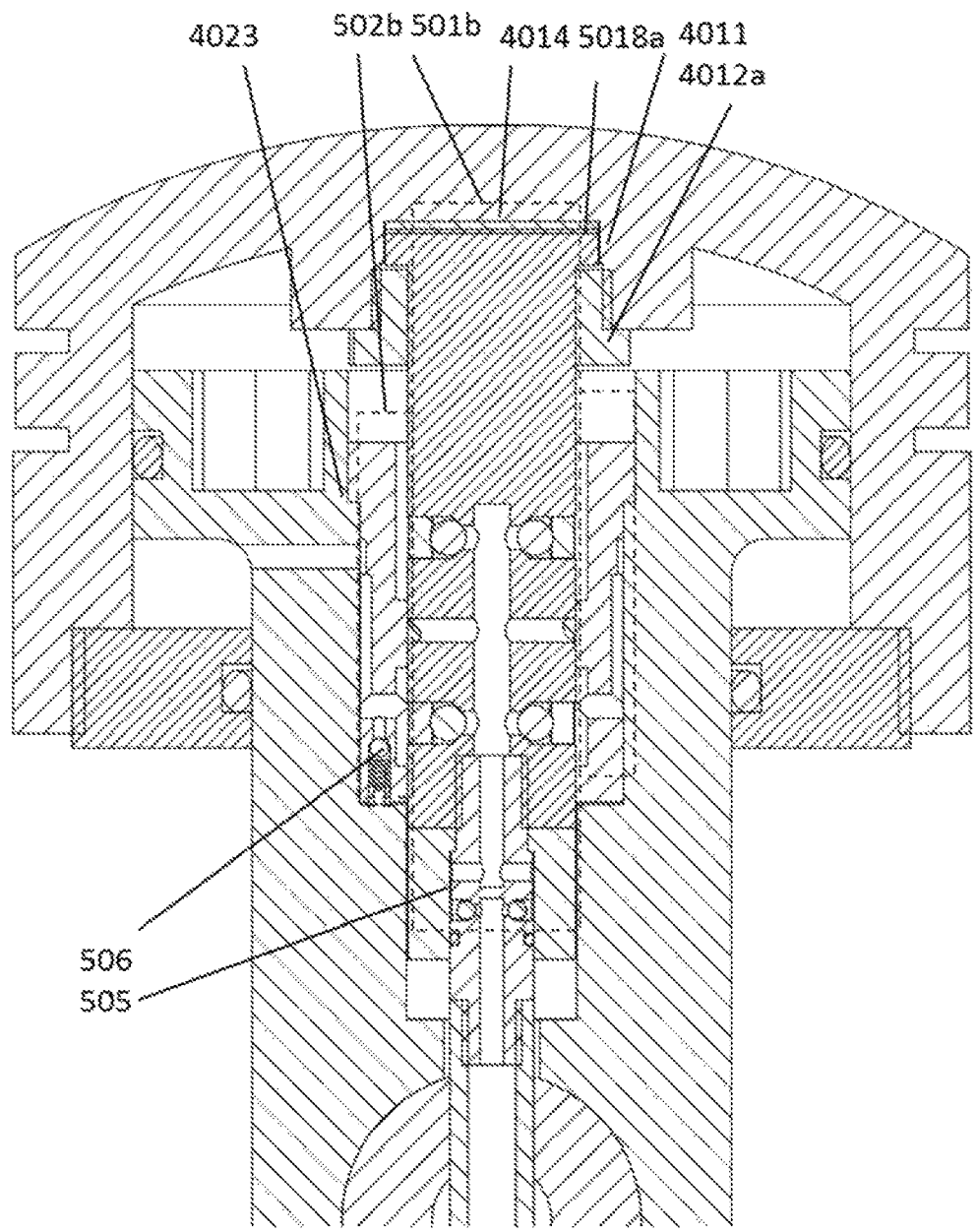
FIG. 19 is a structural diagram showing a three-position three-way spiral-groove self-pumping variable compression ratio piston.
Figure 20:
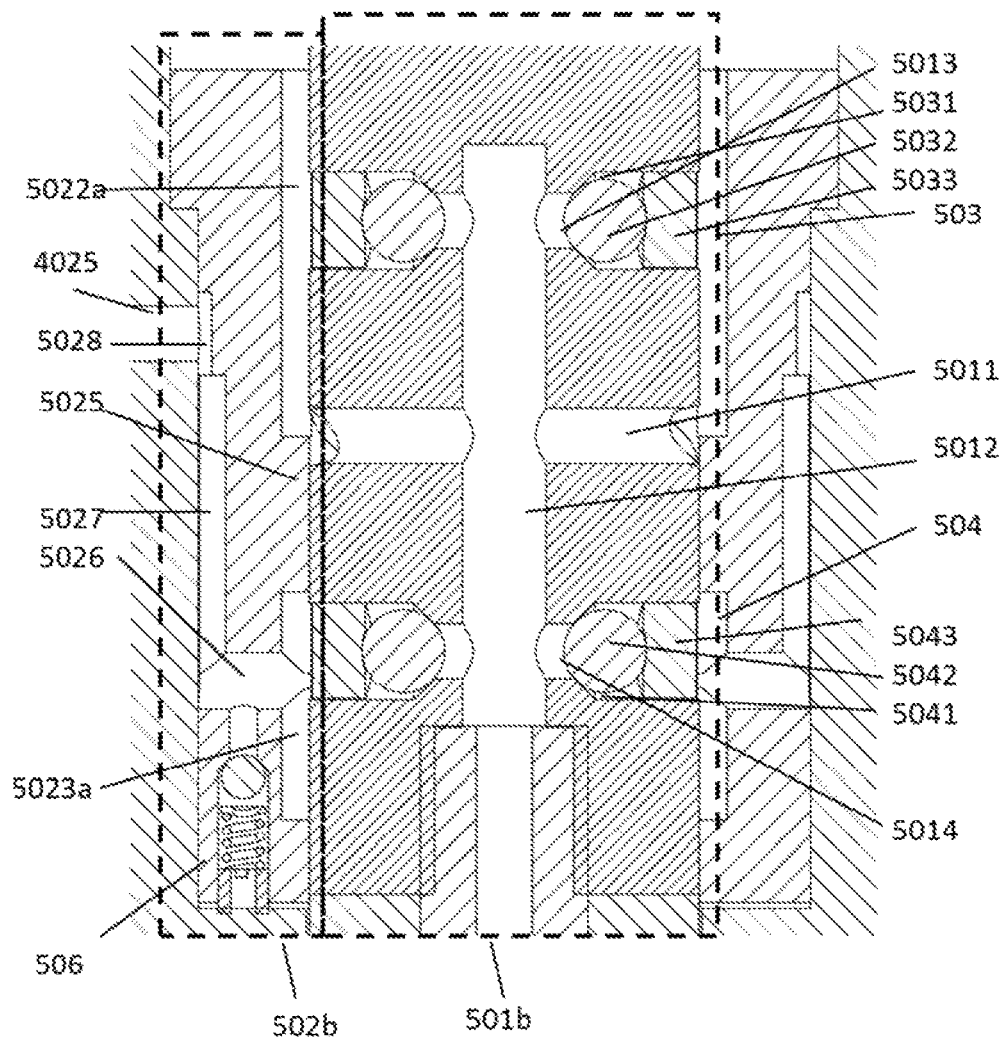
FIG. 20 is a sectional view showing a three-position three-way spiral-groove self-pumping variable compression ratio piston control valve.
Figure 21:
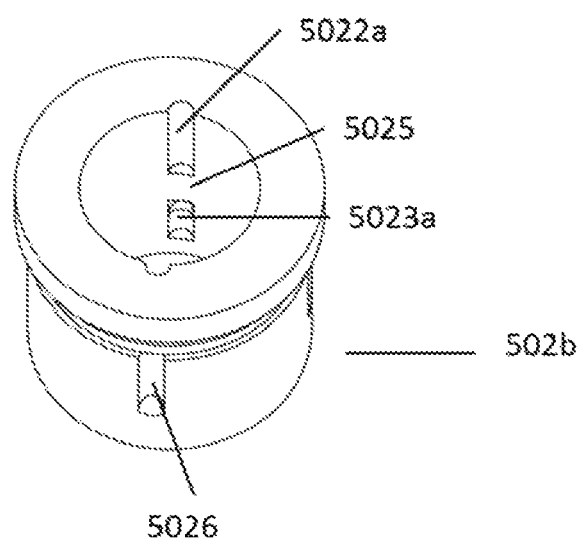
FIG. 21 is a sectional view showing a three-position three-way spiral-groove self-pumping variable compression ratio piston control valve sleeve.
Figure 22:
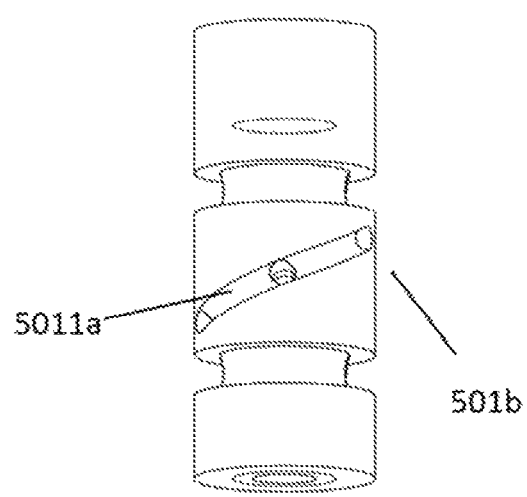
FIG. 22 is a perspective view showing a three-position three-way spiral-groove self-pumping variable compression ratio piston control valve element.
Figure 23:
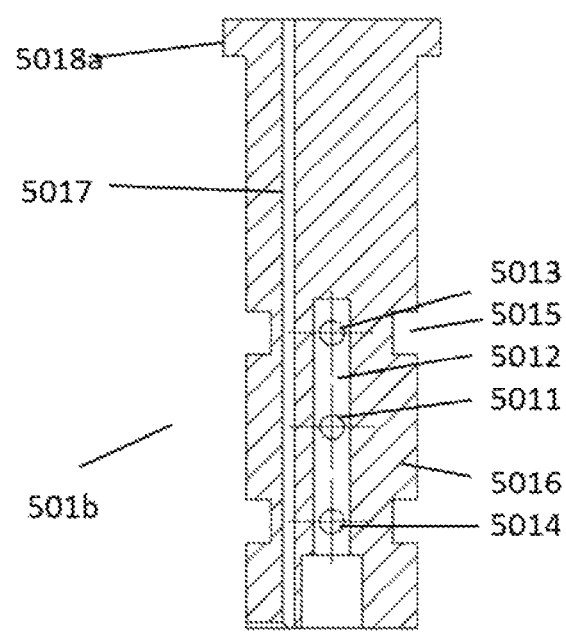
FIG. 23 is a sectional view showing a three-position three-way spiral-groove self-pumping variable compression ratio piston control valve element.

A working hydraulic oil one-way inflow valve (505) is installed on the bottom of the control valve element; a circlip-type horizontal moving check valve is installed on a valve element (5051) of the working hydraulic oil one-way inflow valve (505); the horizontal moving check valve comprises a valve hole (5055), a valve seat (5054), a valve element (5057) and a circlip-type spring (5056); a flow direction of the horizontal moving check valve is from inside to outside; the upper portion of the valve element (5051) is provided with a radial hole (5059), a lower central hole (50511) and an upper central hole (50510) are arranged in the middle of the valve element (5051), and the lower central hole (50511) and the upper central hole (50510) are not communicated with each other; the valve element (5051) is sleeved with a valve sleeve (5052); the valve element (5051) and the valve sleeve (5052) can be in interference fit with each other to realize the seal; and as shown in FIG. 18, a sealing ring (5058) may also be installed, a gap (5059) is reserved between the valve element (5051) and the valve sleeve (5052), thereby realizing a purpose of working hydraulic oil flowing into the upper central hole from the lower central hole (50510) via the check valve.

The control valve element (501*a*) is provided with a longitudinal hole (5017) for communicating the space of the installation hole (4011) and the exterior; and the longitudinal hole (5017) is not communicated with the central hole (5012), thereby eliminating the pressure generated by the leakage of little hydraulic oil, and reducing the operating force of the control valve element.

Embodiment 2 of the control valve: FIG. 19-FIG. 23 show a structure of a three-position three-way spiral-groove self-pumping variable compression ratio piston; an overall structure of the variable compression ratio piston is integrally of a double-acting hydraulic cylinder; a control valve sleeve (502*b*) is fixed in an installation hole (4023) arranged on the inner piston; a control valve element installation hole (4011) is arranged on the inner surface of the top of the outer piston; a positioning step (5018*a*) of the control valve element (501*b*) is fixed in the valve element installation hole (4011) by virtue of a positioning nut (4012*a*); an anti-thrust mat (4014) is installed on the top of the control valve element, and the control valve element (501*b*) can rotate in the installation hole (4011).

The control valve element (501*b*) of the three-position three-way spiral-groove self-pumping variable compression ratio piston is of a tubular structure with a central hole (5012); a group of valve element oil outlets (5011) is distributed in the middle of the control valve element in the radial direction, a group of upper oil inlets (5013) is distributed at the upper end in the radial direction, and a group of lower oil inlets (5014) is distributed at the lower end; a circlip-type spring groove (5015) is distributed at the outer circumference of the upper oil inlet (5013) of the control valve element, and a circlip-type spring groove (5016) is distributed at the outer circumference of the lower oil inlet (5013) of the control valve element; the outer circumference of the control valve element (601*b*) is provided with a group of spiral grooves (5011*a*); the valve element oil outlet (5011) is disposed in the middle of the spiral groove (5011*a*); an inner hole of the control valve sleeve (502*b*) is provided with a slide-sleeve upper cylinder longitudinal groove (5022*a*) and a valve sleeve lower cylinder lower longitudinal groove (5023*a*), and the slide-sleeve upper cylinder annular groove (5022*a*) is communicated with the upper hydraulic cylinder (4021); the slide-sleeve lower cylinder lower annular groove (5023*a*) is communicated with the lower hydraulic cylinder through oil passages (5026, 5027, 5028); a safety valve (506) is installed in a safety valve installation hole (5029) on the valve sleeve, an inlet of the safety valve is communicated with the lower hydraulic cylinder, an outlet extends out of the piston, and the opening pressure of the safety valve (506) is higher than the working pressure of the lower hydraulic cylinder when the engine is at the highest rotation speed; a valve sleeve lower sealing section (5025) is provided between the upper cylinder longitudinal groove (5022*a*) and the lower cylinder lower longitudinal groove (5023*a*), and when the valve sleeve lower sealing section (5025) is disposed in the middle of the spiral groove (5011*a*), the valve sleeve lower sealing section (5025) can completely seal the spiral groove (5011*a*); and the upper oil inlets (5013) of the control valve element and the lower oil inlets (5014) of the control valve element are always communicated with the slide-sleeve upper cylinder annular groove (5022*a*) and the slide-sleeve lower cylinder lower annular groove (5023*a*) during the working process.

The circlip-type horizontal moving check valves (503, 504) are installed in the upper and lower oil inlets (5013, 5014) of the control valve element, and the circlip-type horizontal moving check valves (503, 504) respectively consist of a valve seat (5031, 5041), a valve element (5032, 5042) and a circlip-type spring (5033, 5034).

A working hydraulic oil one-way inflow valve (505) is installed on the bottom of the control valve element, and the structure of the working hydraulic oil one-way inflow valve is the same with the structure of the three-position three-way axial moving self-pumping variable compression ratio working hydraulic oil one-way inflow valve (505).

The control valve element (501*b*) is provided with a longitudinal hole (5017) for communicating the space of the installation hole (4011) and the exterior; and the longitudinal hole (5017) is not communicated with the central hole (5012), thereby eliminating the pressure generated by the leakage of little hydraulic oil, and reducing the operating force of the control valve element.

It can be seen from the above description that compared with the control valve element (501*a*), the control valve element (501*b*) is additionally provided with the spiral grooves (5011*a*), the installation way is changed from the installation by the nut and the lead screw to the rotating and sliding installation; and comparing the control valve sleeve (502*b*) and the control valve sleeve (502*a*), the upper cylinder annular groove (5022) and the lower cylinder lower annular groove (5023) are changed to the upper cylinder longitudinal groove (5022*a*) and the lower cylinder lower longitudinal groove (5023*a*), and other structures are identical.

Figure 24:
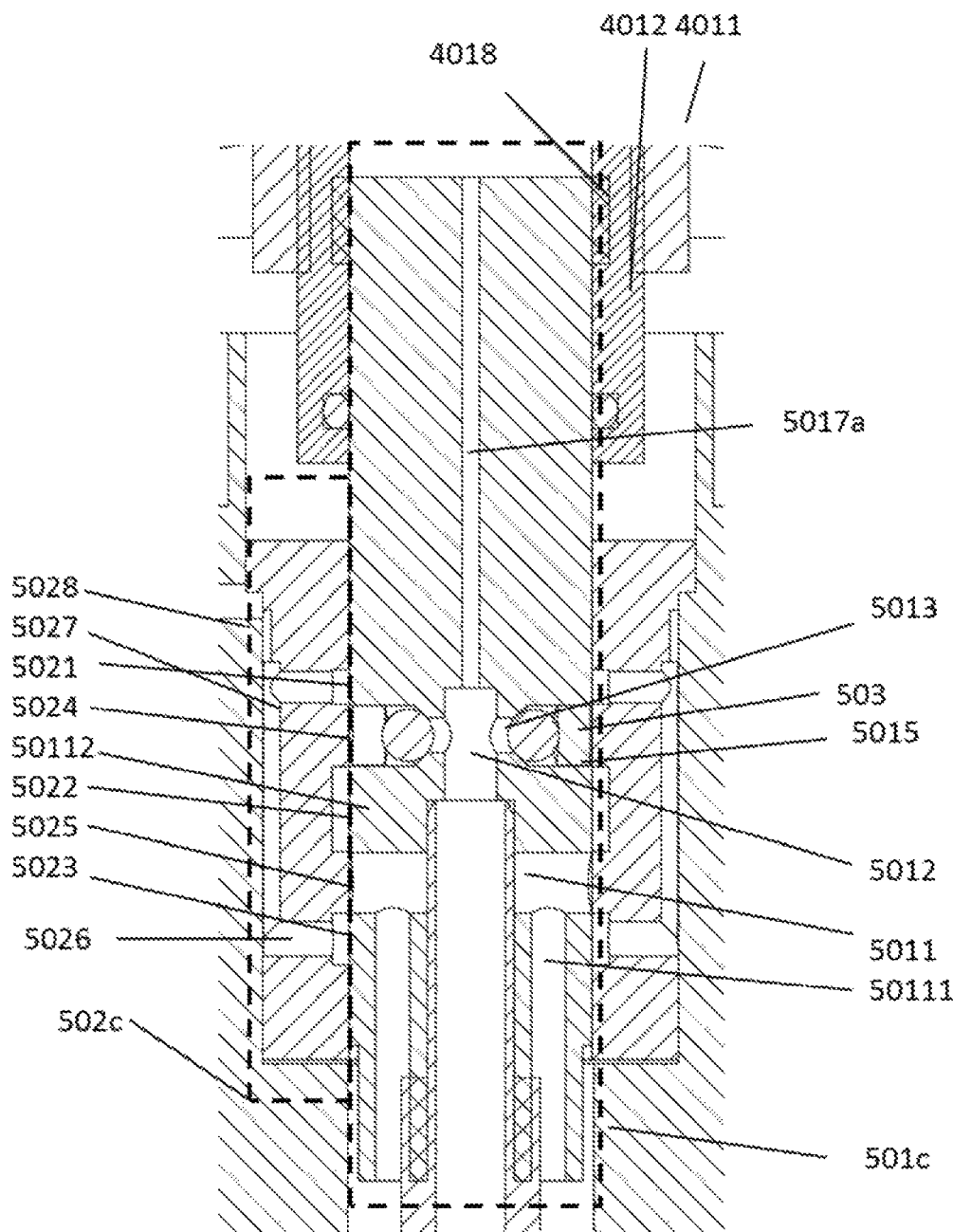
FIG. 24 is a sectional view showing a three-groove slide-sleeve three-position four-way external-liquid-type variable compression ratio piston control valve.
Figure 25:
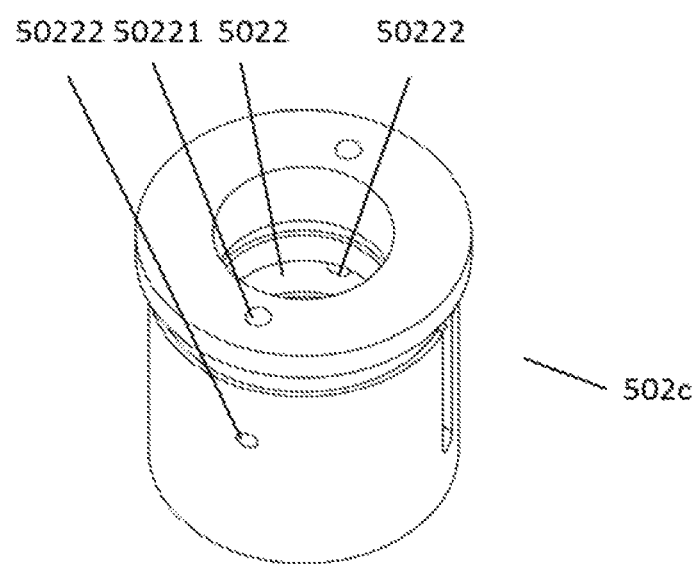
FIG. 25 is a structural diagram showing a three-groove slide-sleeve three-position four-way external-liquid-type variable compression ratio piston control valve sleeve.

Embodiment 3 of a control valve: FIG. 24-FIG. 25 show a structure of a three-groove slide-sleeve three-position four-way external-liquid-type variable compression ratio piston control valve, and a control valve element (501*c*) is installed in an installation hole (4011) by adopting a nut (4012) and a lead screw (5018); the control valve element (501*c*) is provided with a group of radial valve element oil outlets (5011) and a group of valve element upper oil inlets (5013); the radial valve element oil outlet (5011) is not communicated with the central hole (5012), the valve element oil outlet (5011) is communicated with a longitudinal oil discharging port (50111), and the longitudinal oil discharging port (50111) discharges the hydraulic oil out of the piston; the valve element upper oil inlet (5013) is identical to that in embodiment 1 and embodiment 2; a circlip-type horizontal moving check valve (503) is installed in the valve element upper oil inlet (5013), and the circlip-type horizontal moving check valve (503) is identical to the circlip-type check valve of the embodiment 1 and embodiment 2 and consists of a valve seat (5031), a valve element (5032) and a circlip-type spring (5033); a sealing section (50112) is provided between the valve element upper oil inlet (5013) and the valve element oil outlet (5011) of the control valve element (501*c*); the inner hole of the control valve sleeve (502*c*) is provided with three annular grooves, i.e. a valve sleeve lower cylinder upper annular groove (5021), a valve sleeve upper cylinder annular groove (5022) and a valve sleeve lower cylinder lower annular groove (5023), and two sealing sections, i.e. an upper valve sleeve sealing section (5024) and a lower valve sleeve sealing section (5025) are arranged among the annular grooves; the valve sleeve upper cylinder annular groove (5022) is communicated with the upper hydraulic cylinder through a longitudinal hole (50221) and a radial hole (50222); the valve sleeve lower cylinder upper annular groove (5021) and the valve sleeve lower cylinder lower annular groove (5023) are communicated with the lower hydraulic cylinder through oil passages (5026, 5027, 5028); the height of the valve sleeve upper sealing section (5024) is greater than or equal to the height of a circlip-type spring groove (5015) on the outer circumference of the valve element upper oil inlet (5013), the height of the valve sleeve lower sealing section (5025) is greater than or equal to the height of the valve element oil outlet (5011), and the height of the valve element upper sealing section (50112) is greater than or equal to the height of the valve sleeve upper cylinder annular groove (5022); when the control valve element (501*c*) moves upwards, the valve sleeve lower cylinder upper annular groove (5021) is communicated with the valve element upper oil inlet (5013), the valve sleeve upper cylinder annular groove (5022) is communicated with the valve element oil outlet (5011), the hydraulic oil is discharged from the upper hydraulic cylinder and enters the lower hydraulic cylinder, the inner piston moves up, the valve sleeve (502*c*) is driven to move upwards, and finally the control valve is closed; and when the control valve element (501*c*) moves downwards, the valve sleeve lower cylinder lower annular groove (5023) is communicated with the valve element oil outlet (5011), the valve sleeve upper cylinder annular groove (5022) is communicated with the valve element oil inlet (5013), the oil enters the upper hydraulic cylinder and is discharged from the lower hydraulic cylinder, the inner piston moves down, the valve sleeve (502*c*) is driven to move upwards, and the control valve is finally closed, thereby realizing the movement of the inner piston along with the valve element.

The control valve element (501*c*) is provided with a longitudinal hole (5017*a*) for communicating the space of the installation hole (4011) and the central hole (5012), thereby eliminating the pressure generated by the leakage of little hydraulic oil, and reducing the operating force of the control valve element.

Figure 26:
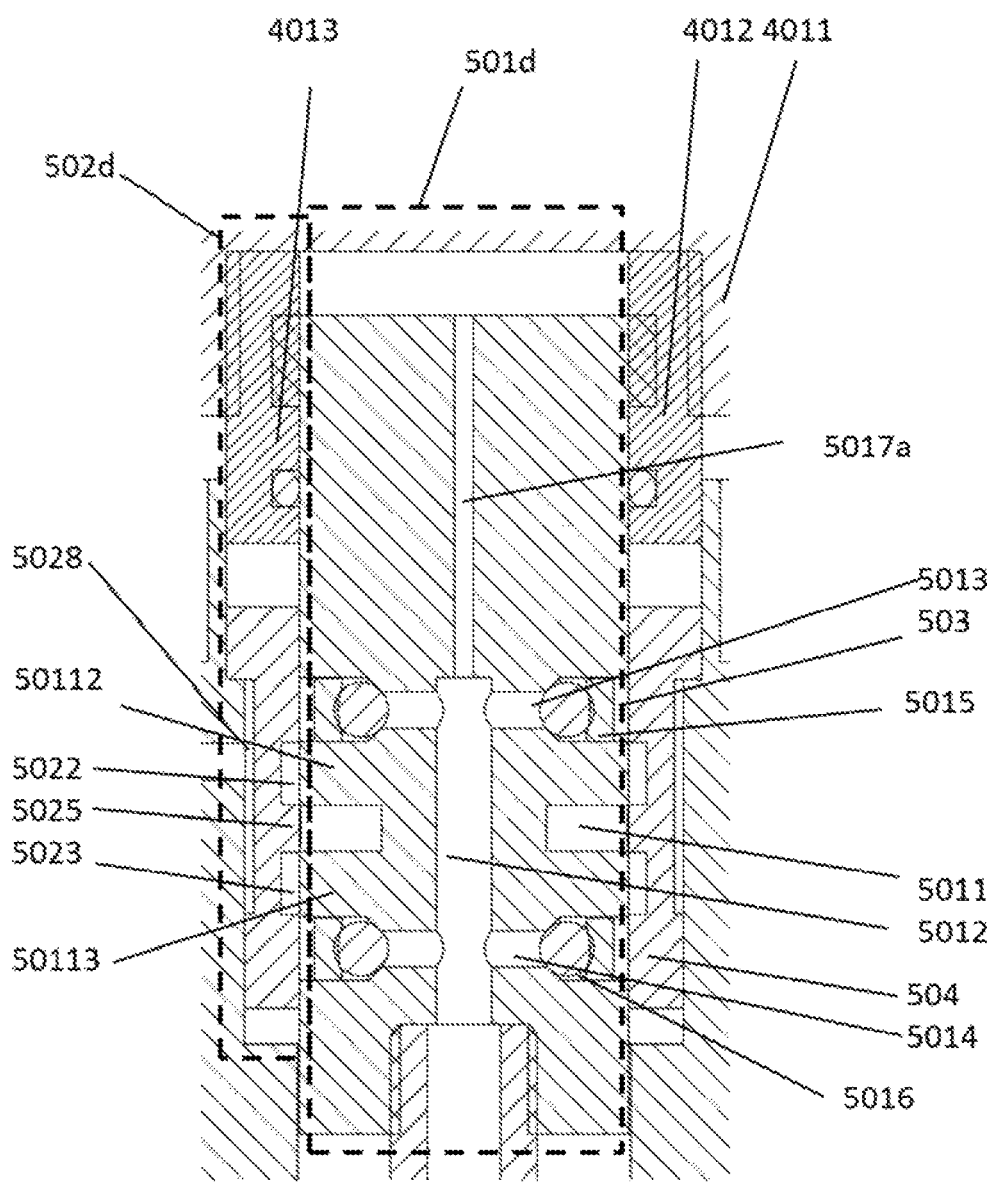
FIG. 26 is a sectional view showing a two-groove slide-sleeve three-position four-way external-liquid-type variable compression ratio piston control valve.
Figure 27:
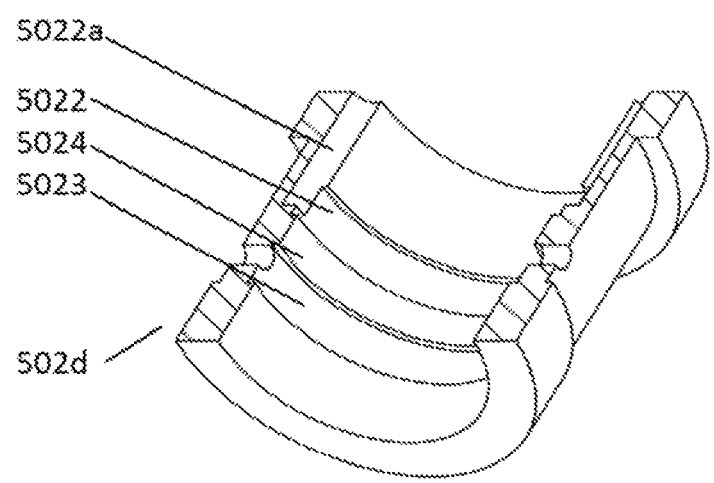
FIG. 27 is a structural diagram showing a two-groove slide-sleeve three-position four-way external-liquid-type variable compression ratio piston control valve sleeve.
Figure 28:
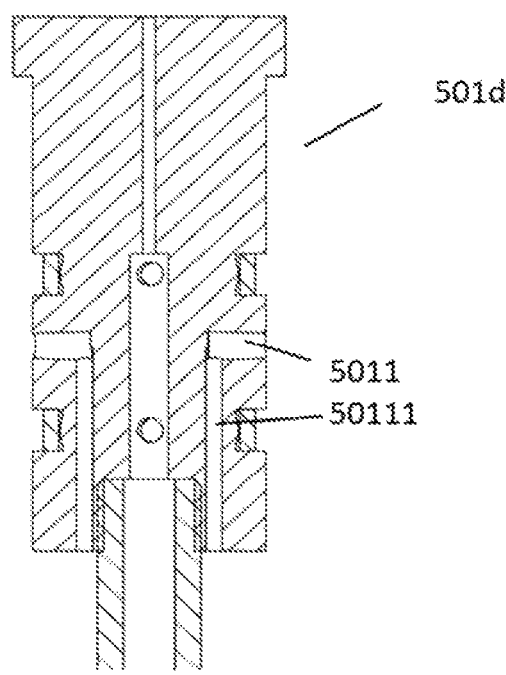
FIG. 28 is a structural diagram showing a two-groove slide-sleeve three-position four-way external-liquid-type variable compression ratio piston control valve element.
Figure 29:
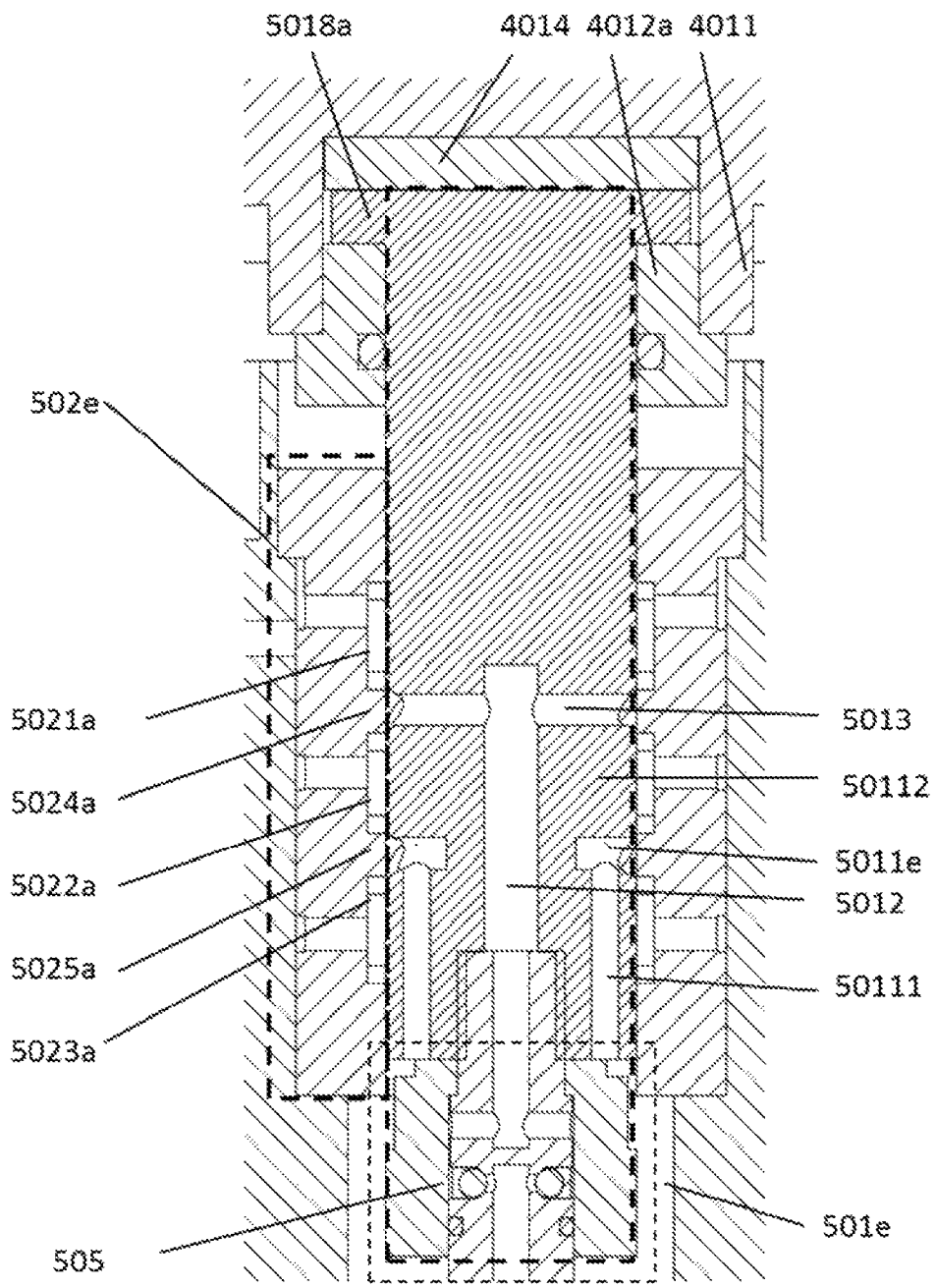
FIG. 29 is a sectional view showing a three-position four-way spiral-groove longitudinally-distributed variable compression ratio piston control valve.
Figure 30:
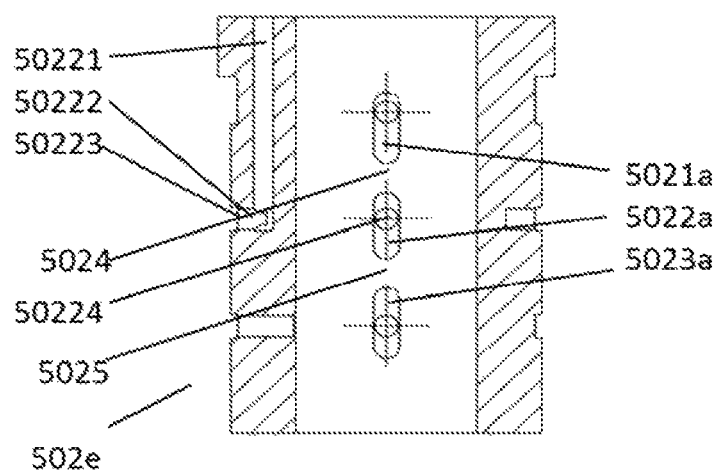
FIG. 30 is a sectional view showing a three-position four-way spiral-groove longitudinally-distributed variable compression ratio piston control valve sleeve (showing an upper hydraulic cylinder flow passage)
Figure 31:
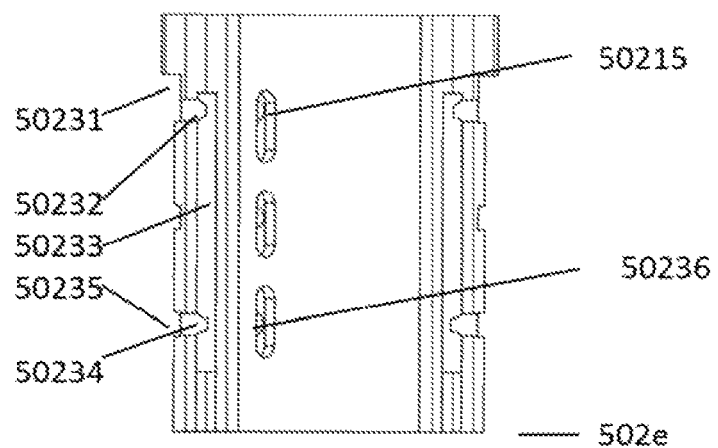
FIG. 31 is a sectional view showing a three-position four-way spiral-groove longitudinally-distributed variable compression ratio piston control valve sleeve (showing a lower hydraulic cylinder flow passage)
Figure 32:
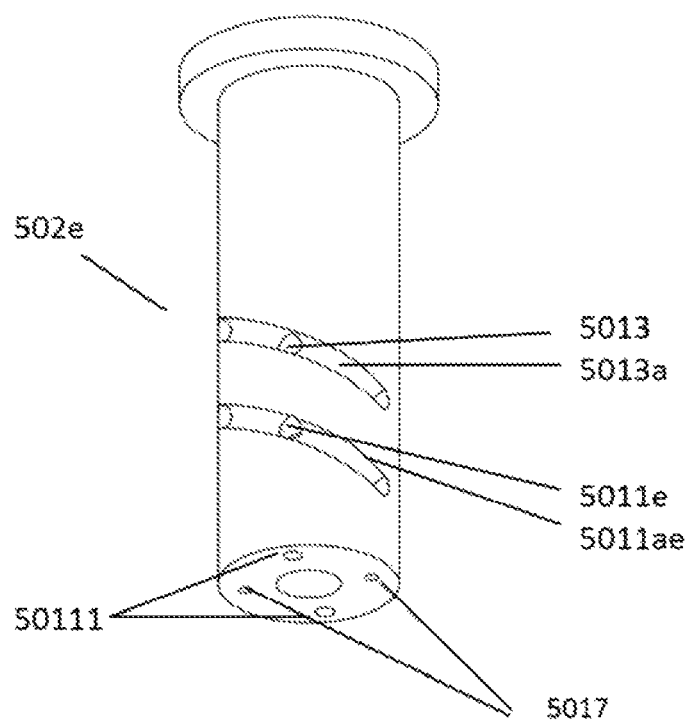
FIG. 32 is a perspective view showing a three-position four-way spiral-groove longitudinally-distributed variable compression ratio piston control valve element.

Embodiment 4 of a control valve: FIG. 26-FIG. 28 show a structure of a two-groove slide-sleeve three-position four-way external-liquid-type variable compression ratio piston control valve, and the control valve element (501*d*) is installed in an installation hole (4011) by adopting a nut (4012) and a lead screw (5018); the control valve element (501*d*) is provided with a group of radial valve element oil outlets (5011), a group of valve element upper oil inlets (5013) and a group of valve element lower oil inlets (5014); the upper oil inlet (5013) of the control valve element (501*d*) and the valve element lower oil inlet (5014) are provided with a circlip-type horizontal moving check valve (503, 504); the radial valve element oil outlet (5011) is not communicated with the central hole (5012), the valve element oil outlet (5011) is communicated with a longitudinal oil discharging port (50111), and the longitudinal oil discharging port (50111) discharges the hydraulic oil out of the piston; two sealing sections (50112, 50113) are provided between the valve element upper oil inlet (5013) and the valve element lower oil inlet (5014) of the control valve element (501*d*); the inner hole of a control valve sleeve (502*d*) is provided with two annular grooves, i.e. a valve sleeve lower cylinder lower annular groove (5023) and a valve sleeve upper cylinder annular groove (5022), and an upper valve sleeve sealing section (5024) is provided between the annular grooves; the valve sleeve upper cylinder annular groove (5022) is communicated with the upper hydraulic cylinder through the longitudinal groove (5022*a*), and the valve sleeve lower cylinder lower annular groove (5023) is communicated with the lower hydraulic cylinder through an oil passage (5028); the height of the valve sleeve lower sealing section (5024) is greater than or equal to the height of a circlip-type spring groove (5015) on the outer circumference of the valve element upper oil inlet (5013), the height of the valve sleeve lower sealing section (5025) is greater than or equal to the height of the valve element oil outlet (5011), and the height of the valve element upper sealing section (50112) is greater than or equal to the height of the valve sleeve upper cylinder annular groove (5022); the height of the valve element lower sealing section (50113)

is greater than or equal to the height of the valve sleeve lower cylinder lower annular groove (5023); when the control valve element (501d) moves upwards, the valve sleeve upper annular groove (5022) is communicated with the valve element oil outlet (5013), the valve sleeve lower cylinder lower annular groove (5023) is communicated with the valve element lower oil inlet (5014), oil is discharged from the upper hydraulic cylinder and enters the lower hydraulic cylinder, the inner piston moves up, the valve sleeve (502d) is driven to move upwards, and finally the control valve is closed; when the control valve element (501d) moves downwards, the valve sleeve upper cylinder annular groove (5022) is communicated with the valve element upper oil inlet (5013), the valve sleeve lower cylinder lower annular groove (5023) is communicated with the valve element oil outlet (5011), the oil enters the upper hydraulic cylinder and is discharged from the lower hydraulic cylinder, the inner piston moves down, the valve sleeve (502d) is driven to move upwards, and finally the control valve is closed, thereby realizing the movement of the inner piston along with the valve element.

The control valve element (501d) is provided with a longitudinal hole (5017a) for communicating the space of the installation hole (4011) and the central hole (5012), thereby eliminating the pressure generated by the leakage of little hydraulic oil, and reducing the operating force of the control valve element.

Embodiment 5 of a control valve: FIG. 29-FIG. 32 show a structure of a three-position four-way spiral-groove longitudinally-distributed variable compression ratio piston control valve, and a control valve element (501e) is installed in an installation hole (4011) by adopting a positioning nut (4012a) and a positioning step (5018a); the control valve element (501e) is provided with a group of radial valve element oil outlets (5011e) and a group of valve element upper oil inlets (5013), and the valve element oil outlets (5011e) and the valve element upper oil inlets (5013) are distributed longitudinally; the outer circumference of the valve element is provided with two groups of spiral grooves (5011ae, 5013a); the radial valve element oil outlet (5011e) and the valve element upper oil inlet (5013) are disposed in the spiral grooves (5011ae, 5013a); the radial valve element oil outlet (5011e) is not communicated with the central hole (5012); the valve element oil outlet (5011e) is communicated with the longitudinal oil discharging port (50111), and the longitudinal oil discharging port (50111) discharges the hydraulic oil out of the piston; the bottom of the valve element is provided with the working liquid one-way inflow valve (505); an inner hole of the control valve sleeve (502e) is provided with three groups of longitudinal grooves, i.e. a valve sleeve lower cylinder upper annular groove (5021a), a valve sleeve upper longitudinal groove (5022a) and a valve sleeve lower cylinder lower longitudinal groove (5023a); two sealing sections, i.e. an upper valve sleeve sealing section (5024) and a lower valve sleeve sealing section (5025) are provided among the longitudinal grooves; the valve sleeve upper cylinder longitudinal groove (5022a) is communicated with the upper hydraulic cylinder through the longitudinal hole (50221), the radial hole (50222), the outer annular groove (50223) and the radial hole (50224), and the valve sleeve lower cylinder upper annular groove (5021a) and the valve sleeve lower cylinder lower annular groove (5023a) are communicated with the lower hydraulic cylinder through oil passages (50231, 50232, 50233, 50234, 50235, 50236, 50215); the height of the valve sleeve upper sealing section (5024) is greater than or equal to the height of the valve element upper oil inlet (5013), the height of the valve sleeve lower sealing section (5025) is greater than or equal to the height of the valve element oil outlet (5011), and the height of the valve element upper sealing section (50112) is greater than or equal to the height of the valve sleeve upper cylinder annular groove (5022a); when the control valve element (501e) rotates, a junction of the control valve element spiral groove and the valve sleeve longitudinal groove moves up relatively, the valve sleeve lower cylinder upper longitudinal groove (5021a) is communicated with the valve element upper oil inlet (5013), the valve sleeve upper cylinder longitudinal groove (5022a) is communicated with the valve element oil outlet (5011e), the oil is discharged from the upper hydraulic cylinder and enters the lower hydraulic cylinder, the inner piston moves up, the valve sleeve (502e) is driven to move upwards, and finally the control valve is closed; when the control valve element (501e) rotates, the junction of the control valve element spiral groove and the valve sleeve longitudinal groove moves down relatively, the valve sleeve lower cylinder lower longitudinal groove (5023a) is communicated with the valve element oil outlet (5011a), the valve sleeve upper cylinder longitudinal groove (5022a) is communicated with the valve element oil inlet (5013), the oil enters the upper hydraulic cylinder and is discharged from the lower hydraulic cylinder, the inner piston moves down, the valve sleeve (502e) is driven to move upwards, and finally the control valve is closed, thereby realizing the movement of the inner piston along with the valve element.

The control valve element (501e) is provided with a longitudinal hole (5017) for communicating the space of the installation hole (4011) and the exterior; and the longitudinal hole (5017) is not communicated with the central hole (5012), thereby eliminating the pressure generated by the leakage of little hydraulic oil, and reducing the operating force of the control valve element.

Figure 33:
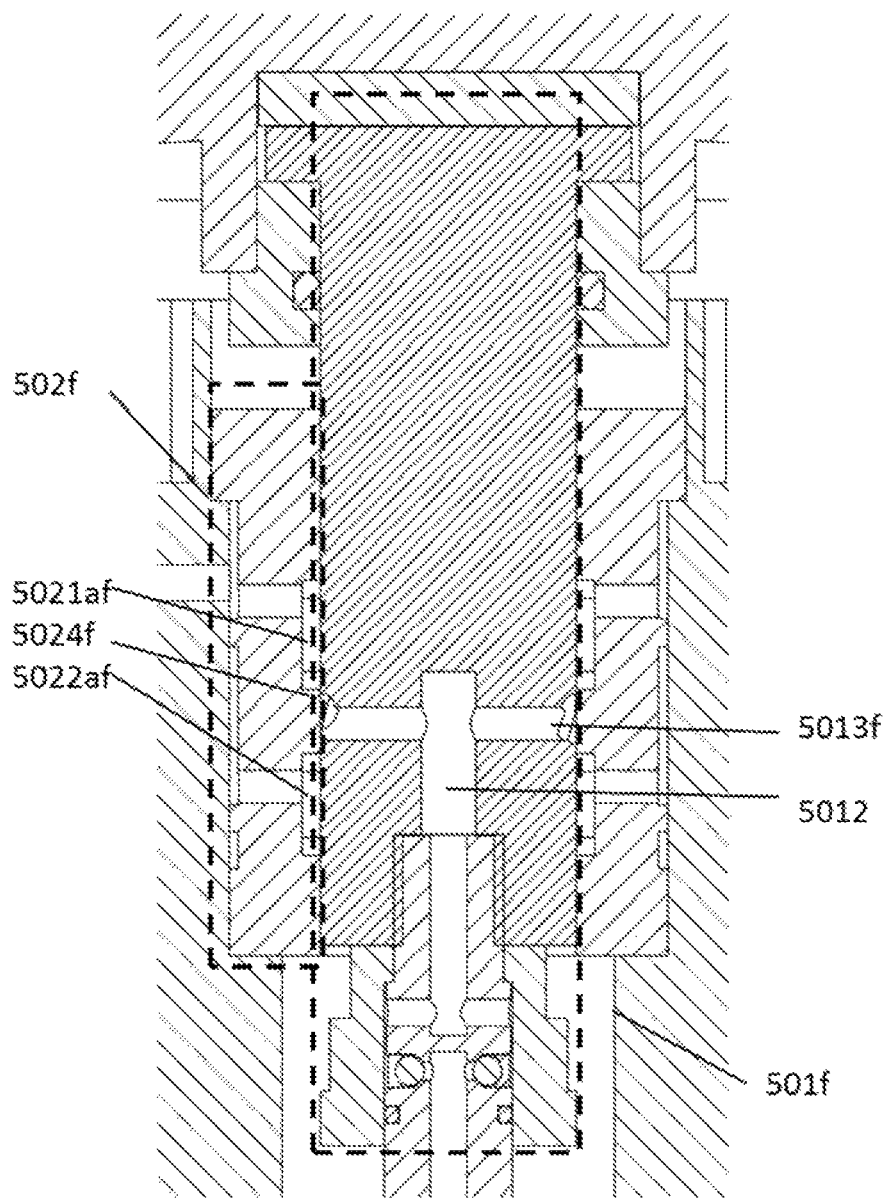
FIG. 33 is a sectional view showing a three-position four-way spiral-groove circumferentially-distributed variable compression ratio piston control valve (liquid flows in)
Figure 34:
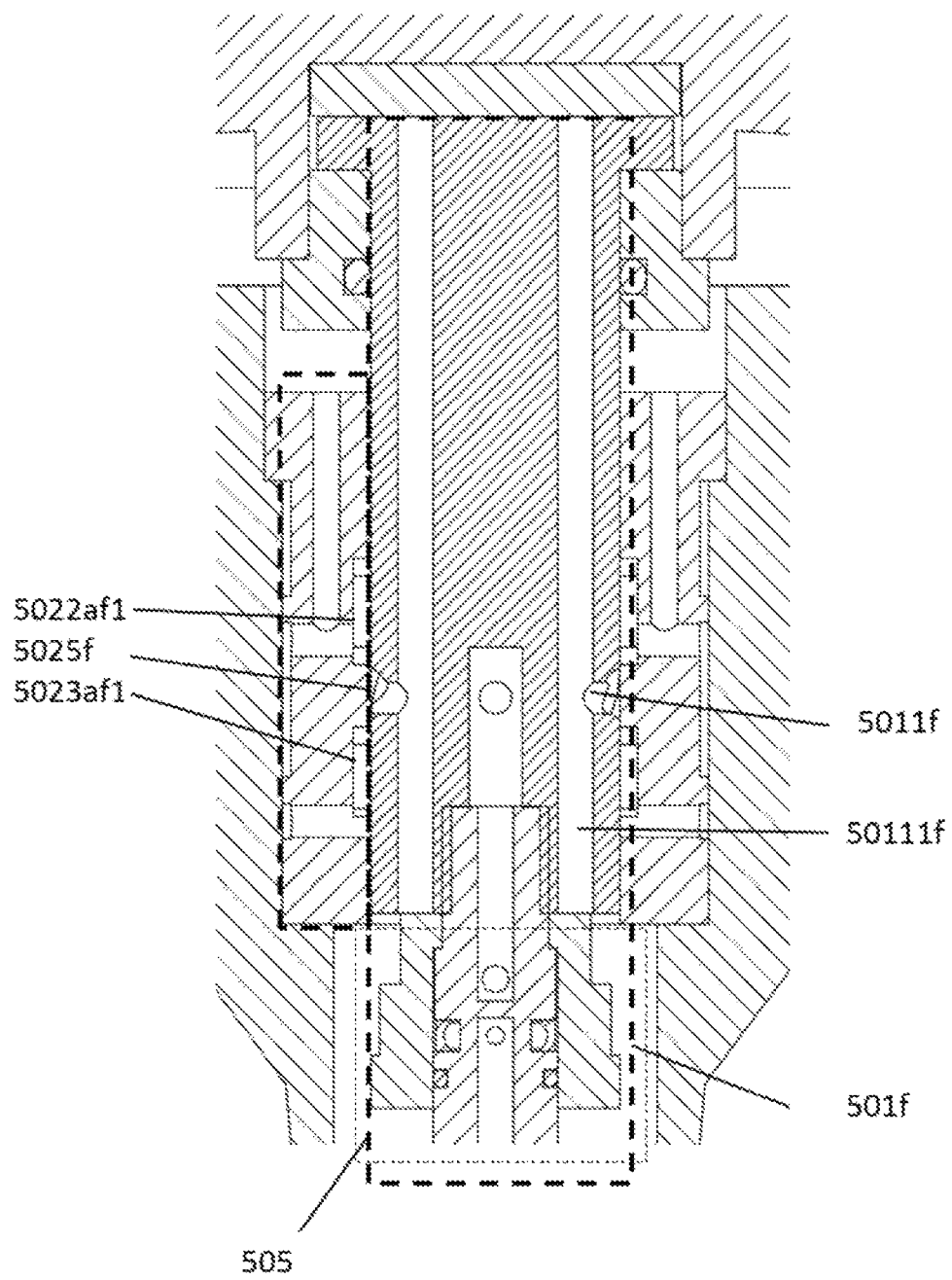
FIG. 34 is a sectional view showing a three-position four-way spiral-groove circumferentially-distributed variable compression ratio piston control valve (liquid flows out)
Figure 35:
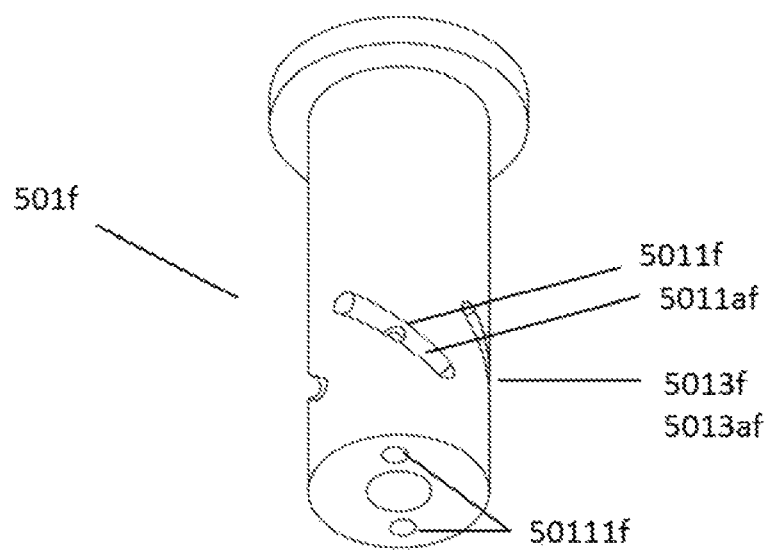
FIG. 35 is a perspective view showing a three-position four-way spiral-groove circumferentially-distributed variable compression ratio piston control valve element.
Figure 36:
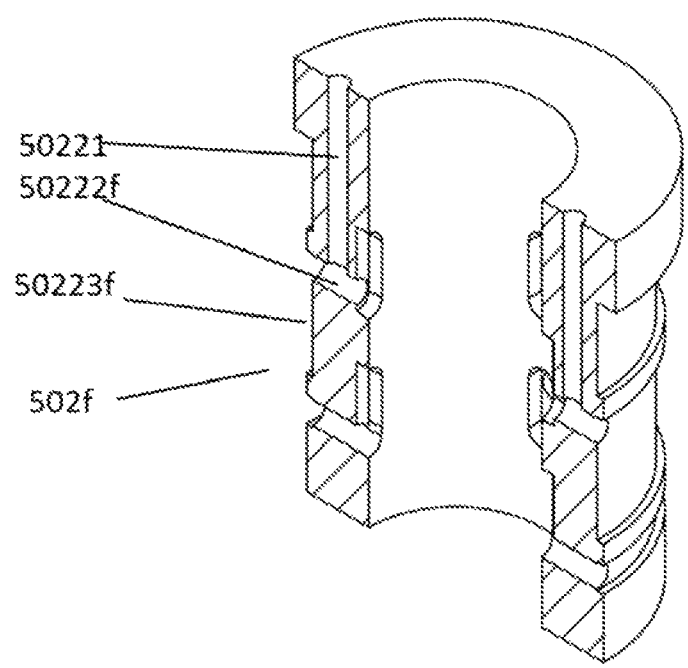
FIG. 36 is a structural diagram showing a three-position four-way spiral-groove circumferentially-distributed variable compression ratio piston control valve sleeve (showing an upper hydraulic cylinder flow passage)
Figure 37:
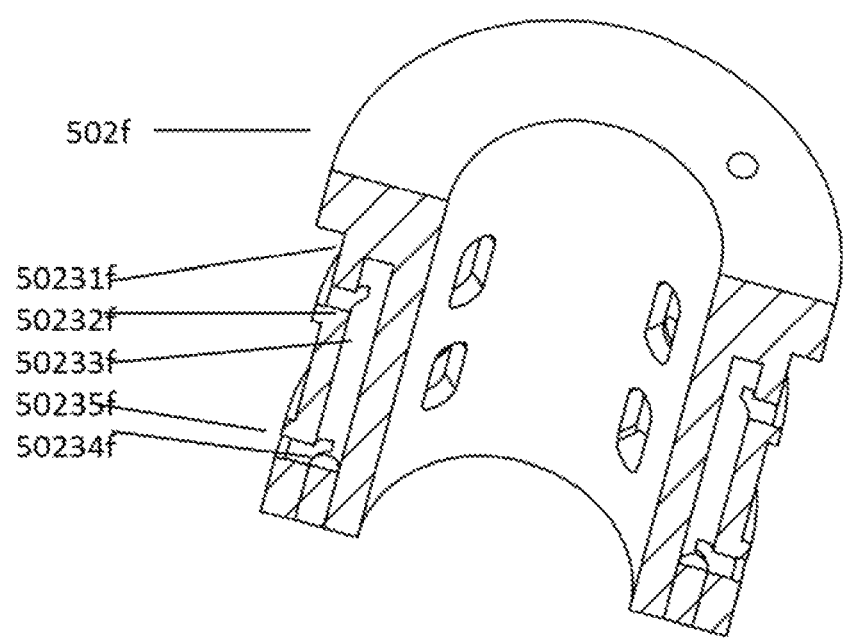
FIG. 37 is a structural diagram showing a three-position four-way spiral-groove circumferentially-distributed variable compression ratio piston control valve sleeve (showing a lower hydraulic cylinder flow passage).

Embodiment 6 of a control valve: FIG. 33-FIG. 37 show a structure of a three-position four-way spiral-groove circumferentially-distributed variable compression ratio piston control valve, and a control valve element (501f) is installed in an installation hole (4011) by adopting a positioning nut (4012a) and a positioning step (5018a); the control valve element (501f) is provided with a group of valve element oil outlets (5011f) and a group of valve element oil inlets (5013f), and the valve element oil outlets (5011f) and the valve element upper oil inlets (5013f) are alternately distributed along the circumference; the outer circumference of the valve element is provided with two groups of spiral grooves (5011af, 5013af); the radial valve element oil outlet (5011f) and the valve element oil inlet (5013f) are disposed in the spiral grooves (5011af, 5013af); the radial valve element oil outlet (5011f) is not communicated with the central hole (5012); the valve element oil outlet (5011f) is communicated with a longitudinal oil discharging port (50111f), and the longitudinal oil discharging port (50111f) discharges the hydraulic oil out of the piston; the longitudinal oil discharging hole is also longitudinally communicated with the top of the valve element, thereby realizing an effect of eliminating the pressure in the installation hole (4011); the bottom of the valve element is provided with a working liquid one-way inflow valve (505); a control valve sleeve (502f) is provided with four groups of longitudinal grooves, the top and the bottom are respectively provided with two groups of longitudinal grooves, the two groups of circumferentially-distributed longitudinal grooves are respectively communicated with the upper hydraulic cylinder and the lower hydraulic cylinder, the upper group and the lower group of longitudinal grooves in the longitudinal direction are communicated with different hydraulic cylinders, two groups of longitudinal grooves control the inflow, and two groups of longitudinal grooves control the outflow; FIG. 33 shows a section of an inflow control direction, the upper longitudinal groove (5021af) is communicated with the lower hydraulic cylinder, the lower longitudinal groove (5022af) is communicated with the upper hydraulic cylinder, and the direction is opposite to the upper oil inlet (5013f) of the control valve element; FIG. 34 shows a section of an outflow control direction, the upper longitudinal groove (5022af1) is communicated with the upper hydraulic cylinder, the lower longitudinal groove (5021af1) is communicated with the lower hydraulic cylinder, and the direction is opposite to the control valve element oil outlet (5011f); the upper hydraulic cylinder is communicated with the upper longitudinal groove (5022af) and the lower longitudinal groove (5022f) by virtue of oil passages (50221, 50222f, 50223f), the lower hydraulic cylinder is communicated with the upper longitudinal groove (5021af) and the lower longitudinal groove (5021af1) by virtue of oil passages (50231f, 50232f, 50233f, 50234f, 50235f); when the control valve element (501f) rotates, a junction of the control valve element spiral groove and the valve sleeve longitudinal groove moves up relatively, the valve sleeve lower cylinder upper longitudinal groove (5021af) is communicated with the valve element upper oil inlet (5013f), the valve sleeve upper cylinder upper longitudinal groove (5022af1) is communicated with the valve element oil outlet (5011f), oil is discharged from the upper hydraulic cylinder and enters the lower hydraulic cylinder, the inner piston moves up, the valve sleeve (502f) is driven to move upwards, and finally the control valve is closed; when the control valve element (501f) rotates, the junction of the control valve element spiral groove and the valve sleeve longitudinal groove moves down relatively, the valve sleeve lower cylinder lower longitudinal groove (5023af1) is communicated with the valve element oil outlet (5011f), the valve sleeve upper cylinder longitudinal groove (5022af) is communicated with the valve element oil inlet (5013f), oil enters the upper hydraulic cylinder and is discharged from the lower hydraulic cylinder, the inner piston moves down, the valve sleeve (502f) is driven to move upwards, and finally the control valve is closed, thereby realizing the movement of the inner piston along with the valve element.

I claim:

1. A reciprocating piston engine, comprising a double-crankshaft engine that is combined with a variable compression ratio piston, wherein the variable compression ratio piston adopts an outer piston as a cylinder sleeve (401) of a double-acting hydraulic cylinder, and a ring-shaped cover plate (403) is fixed on an opening of the cylinder sleeve (401); an inner piston rod (4026) penetrates through the middle of the ring-shaped cover plate (403); a space within the cylinder sleeve is divided by an inner piston (402) of the double-acting hydraulic cylinder into an upper hydraulic cylinder and a lower hydraulic cylinder (4021, 4022); control valve sleeves (502a, 502b, 502c, 502d, 502e, 502f) of a slide-valve-type directional control valve are fixed in a central installation hole (4023) of the inner piston; control valve elements (501a, 501b, 501c, 501d, 501e, 501f) are installed in another central installation hole (4011) on an inner surface of a piston top in a rotating and sliding manner or by a nut and a lead screw; a drive rod (808) is installed on a control valve element of the slide-valve-type directional control valve of the variable compression ratio piston, a slide sleeve (807) sliding rectilinearly is installed on a lower portion of the drive rod, and a rotating drive mechanism (800) is arranged on the lower portion of the drive rod to drive the slide sleeve (807); the double-crankshaft engine is coupled with two crankshafts that are rotating synchronously in opposite directions through the use of gears; each piston is connected to the two crankshafts by a connecting rod shaft; a position for the drive rod (808, 807) of the variable compression ratio piston to pass through is provided in the middle of the crankshafts and connecting rods of the double-crankshaft engine, and the rotating drive mechanism (800) is installed between the two crankshafts; each crankshaft of the double-crankshaft engine is respectively provided with a crankshaft arm (204); when the slide-valve-type directional control valve is at a balanced hydraulic state, the slide-valve-type directional control valve is closed; when the control valve element is rotated, a valve element oil inlet and a control valve element oil outlet move up relatively, the valve element oil outlet is communicated with the upper hydraulic cylinder, and a working liquid of the variable compression ratio piston is low-pressure liquid, and lubricating oil of an engine lubricating system is directly used as the working liquid of the variable compression ratio piston, and wherein the variable compression ratio piston and the connecting rod are connected through three shafts, and an inner piston push rod (4026) of the variable compression ratio piston is in a sliding fit arrangement with the connecting rod (701) through a three-hole connector to connect the connecting rod.

2. The reciprocating piston engine according to claim 1, wherein each crankshaft is respectively provided with a flywheel (204).

3. The reciprocating piston engine according to claim 2, wherein a completely symmetric structure is adopted in the flywheels, in which each cylinder of the crankshaft is provided with two counterweights, and each counterweight is provided with an additional flywheel.

4. The reciprocating piston engine according to claim 2, wherein the flywheels adopt a weight-reducing structure, wherein the two crankshafts corresponding to each air cylinder are respectively provided with a flywheel-free crankshaft arm (203) with a counterweight and a flywheel crankshaft arm (204) on the other crankshaft both with a counterweight and a flywheel, and different crankshaft arms on the two crankshafts are alternately distributed.

5. The reciprocating piston engine according to claim 2, the flywheels adopt a weight-reducing structure wherein the two crankshafts corresponding to each air cylinder are respectively provided with a flywheel-free crankshaft arm (203) with a counterweight, and different crankshaft arms on the two crankshafts are alternately distributed.

6. The reciprocating piston engine according to claim 1, wherein a slide-valve-type directional control valve of a variable compression ratio piston is: a three-position three-way axis-moving self-pumping variable compression ratio piston control valve; the structure of the slide-valve-type directional control valve is equivalent to a three-position three-way directional valve; the valve sleeve (502a) is provided with two annular grooves (5022, 5023); an upper cylinder annular groove (5022) communicating with the upper hydraulic cylinder; a lower cylinder lower annular groove (5023) communicating with the lower hydraulic cylinder; a valve sleeve sealing section (5025) is provided between the upper cylinder annular groove and the lower cylinder annular groove; the control valve element (501a) is of a hollow type; a hydraulic oil outlet (5011) is provided in the middle portion of the control valve element; the hydraulic oil outlet (5011) is communicated with a central hole (5012) of the control valve element; the hydraulic oil inlet in the middle portion of the control valve element is of an independent porous form, and the hydraulic oil inlet is provided with an annular groove; the diameter or a height of the hydraulic oil outlet in the middle portion of the control valve element is smaller than or equal to a height (5025) of the valve sleeve sealing section; two ends of the control valve element are respectively provided with hydraulic oil inflow holes (5013, 5014); upper and lower check valves (503, 504) are installed in each hydraulic oil inflow hole; liquid flows outwards from the upper and lower check valves; an outlet of the upper check valve (503) is communicated with the upper hydraulic cylinder, and the lower check valve (504) is communicated with the lower hydraulic cylinder; an additional check valve (505) is installed on the top of the drive rod of the control valve element, and the liquid flow direction of the additional check valve is from bottom to top; the control valve element is installed in the control valve sleeve in a sliding manner; the control valve sleeve is fixed on the inner piston; the control valve element (501*a*) is installed in the central installation hole (4011) on the inner surface of the piston top by a nut (4012) and a lead screw (5018); the check valves (503, 504, 505) adopt circlip-type horizontal moving check valves; a safety valve is arranged on the variable compression ratio piston to prevent overpressure during heat expansion of the hydraulic oil; the control valve element (501*a*) is provided with a decompression longitudinal hole (5017) for communicating with a space of the central installation hole (4011) and exterior; and the decompression longitudinal hole (5017) does not communicate with the central hole (5012), thereby reducing the pressure generated by a leakage of little hydraulic oil, and reducing an operating force of the control valve element.

\* \* \* \* \*